（12）United States Patent
Sharma et al.

(10) Patent No.: US 10,885,220 B2
(45) Date of Patent: Jan. 5, 2021

(54) SECURE ACCESS TO PHYSICAL AND DIGITAL ASSETS USING AUTHENTICATION KEY

(71) Applicant: Zortag, Inc., Great Neck, NY (US)

(72) Inventors: Satya Prakash Sharma, East Setauket, NY (US); Joseph Marino, Port Jefferson Station, NY (US)

(73) Assignee: ZORTAG INC., Great Neck, NY (US)

( * ) Notice: Subject to any disclaimer, the term of this patent is extended or adjusted under 35 U.S.C. 154(b) by 152 days.

(21) Appl. No.: 15/878,445

(22) Filed: Jan. 24, 2018

(65) Prior Publication Data

US 2019/0228178 A1 Jul. 25, 2019

(51) Int. Cl.
| | | |
|---|---|---|
| G06F 21/35 | (2013.01) | |
| G06F 21/62 | (2013.01) | |
| G06F 21/31 | (2013.01) | |
| H04L 29/06 | (2006.01) | |
| G06Q 20/40 | (2012.01) | |

(Continued)

(52) U.S. Cl.
CPC .......... *G06F 21/6245* (2013.01); *G06F 21/31* (2013.01); *G06F 21/35* (2013.01); *G06K 7/10366* (2013.01); *G06K 7/1413* (2013.01); *G06K 7/1417* (2013.01); *G06K 19/06037* (2013.01); *G06K 19/0723* (2013.01); *G06K 19/14* (2013.01); *G06Q 10/00* (2013.01); *G06Q 20/4016* (2013.01); *G07F 7/08* (2013.01); *H04L 63/083* (2013.01); *H04L 63/0853* (2013.01)

(58) Field of Classification Search
CPC ...... G06F 21/34; G06F 21/35; G06F 21/6245; H04L 63/0853
See application file for complete search history.

(56) References Cited

U.S. PATENT DOCUMENTS 9,805,182 B1 * 10/2017 Kayyidavazhiyil ..... G06F 21/36
10,026,078 B1 * 7/2018 Nolan ................ G06Q 20/3572

(Continued)

OTHER PUBLICATIONS

Harini et al. 2CAuth: A New Two Factor Authentication Scheme Using QR-Code International Journal of Engineering and Technology (IJET) vol. 5 No. 2 Apr.-May 2013; pp. 1087-1094 (Year: 2013).*

(Continued)

*Primary Examiner* — David J Pearson
(74) *Attorney, Agent, or Firm* — Fay Kaplun & Marcin, LLP

(57) ABSTRACT

Authorized access to a digital asset is obtained by associating an authentication tag with a physical object accessible to a user, by configuring the tag with a first dataset comprised of a random distribution of three-dimensional elements and with a second dataset comprised of machine-readable data elements, and by authorizing a mobile device to scan the elements. The first and second datasets together comprise an authentication key that uniquely identifies the object and, in turn, the user. The authentication key is scanned by a device in response to a prompt from the digital asset to obtain scanned key data. Predetermined key data and a device identifier indicative of the authorized device are stored in a database. Access to the digital asset is allowed when the scanned key data matches the stored predetermined key data, and when the device scanning the data is authorized.

14 Claims, 14 Drawing Sheets

(51) Int. Cl.
  *G06K 7/14*    (2006.01)
  *G06K 7/10*    (2006.01)
  *G06K 19/07*   (2006.01)
  *G06Q 10/00*   (2012.01)
  *G06K 19/06*   (2006.01)
  *G07F 7/08*    (2006.01)
  *G06K 19/14*   (2006.01)

(56) References Cited

U.S. PATENT DOCUMENTS

| | | | | |
|---|---|---|---|---|
| 10,192,084 | B1* | 1/2019 | Sharma | H04L 9/3226 |
| 2004/0035925 | A1* | 2/2004 | Wu | G06K 7/10 235/380 |
| 2008/0112596 | A1 | 5/2008 | Rhoads | |
| 2010/0042846 | A1* | 2/2010 | Trotter | G06F 21/6245 713/182 |
| 2010/0316251 | A1 | 12/2010 | Cowburn | |
| 2010/0319058 | A1* | 12/2010 | Chen | H04L 9/3228 726/6 |
| 2012/0305643 | A1* | 12/2012 | Daniels, Jr. | G06Q 50/22 235/380 |
| 2012/0330769 | A1* | 12/2012 | Arceo | G06Q 20/32 705/21 |
| 2013/0087620 | A1* | 4/2013 | Sharma | G06K 19/06037 235/472.01 |
| 2013/0174241 | A1* | 7/2013 | Cha | H04L 63/205 726/7 |
| 2013/0246272 | A1* | 9/2013 | Kirsch | G06Q 20/3821 705/44 |
| 2015/0213238 | A1* | 7/2015 | Farha | G06F 21/10 726/30 |
| 2015/0221151 | A1 | 8/2015 | Bacco | |
| 2016/0261585 | A1* | 9/2016 | Ito | G06F 21/31 |
| 2016/0286396 | A1* | 9/2016 | Tuukkanen | G06F 21/40 |
| 2017/0032382 | A1* | 2/2017 | Shulman | G06Q 30/06 |
| 2020/0084211 | A1* | 3/2020 | Wang | H04L 63/0853 |

OTHER PUBLICATIONS

International Search Report in corresponding International Application No. PCT/US18/67602, dated Mar. 26, 2019.

* cited by examiner

SECURE ACCESS TO PHYSICAL AND DIGITAL ASSETS USING AUTHENTICATION KEY

BACKGROUND OF THE INVENTION

In the digital economy, securing and allowing access to information only by authorized owners is essential in order to safeguard both physical and digital assets. In a typical setup in most companies, individuals use a user name and a password to connect to a server or website. This approach is incredibly vulnerable; if someone gets hold of the password, they can login pretending to be the user of that account. Since it is difficult to remember all the passwords a person may have used on various websites, people normally use only one password for most of the sites or servers with which they connect. If the security of any one of these sites is breached, the passwords may leak out, and a hacker may access part of the digital information for that individual stored at various websites. This may include bank information, investment accounts, wills, private information, sensitive records, etc.

People also keep a large number of identifying articles with them. These could be cards in their wallet, pockets, or purses. These cards include credit/debit cards, driver's licenses, ID cards, loyalty cards, border crossing cards, government issued cards for accessing benefits, voter identification cards, military cards, and health cards, amongst others. The purpose for these cards is different, and therefore one has no choice except to carry all these cards as needed. The identifying articles need not be in the form of cards. They could be keychains, separate custom plastic tags, custom key tags, hand tags, and key fobs, and the like.

Key fobs are among a class of physical hardware tokens that may also include smart cards and proximity cards. These hardware tokens are often small enough for users to store on key rings, in their wallets, or in their pockets. In an enterprise, key fobs may also be used to enable two-factor and multifactor authentication and to safeguard access to a company's network and data. Biometric authentication may also be incorporated into hardware tokens. Some devices use the traditional fingerprint method, while others require users to swipe the key fob. This action reads the fingerprint ridges, but also the finger pad's seven layers of skin to authenticate the user. Software token applications can offer the same authentication capabilities as the hardware tokens. A user can install a software token application on their smartphone to avoid carrying a physical device on their key ring.

It would be ideal if a person could carry only one Unique Identity and Authentication Key (UIAK) or key in the form of a physical item, card, key fob, or single identifying article that serves all these purposes in addition to allowing access to a website or any secure server. This item can serve as a credit/debit card, health card, ID card, government benefit card, loyalty card, etc., and can also be used as an item that uniquely qualifies a user, allowing a multifactor authentication to access a website or server without a password. It would therefore be desirable to provide methods and systems to assure the security in accessing any physical or digital asset by using the UIAK.

In order to strengthen the security for accessing websites or servers and to reduce the possibility of hacking by unauthorized entities and individuals, multifactor authentication techniques have grown rapidly with most enterprises and individuals. This helps secure digital assets in the wake of cyber attacks, hacking, and heists.

There are three generally accepted factors that are used to establish a digital identity for authentication, including a knowledge factor, which is something that the user knows, such as a password, answers to challenge questions, ID numbers, or a PIN. The second factor is a possession factor: something that the user has, such as a mobile phone or a token. The third factor could be a biometric factor, which is something that the user is, such as his or her fingerprints, eye scan, or voice pattern.

Combining two or more such factors allows for reliable authentication. It is always recommended to use multifactor authentication for that reason. Two-factor authentication (2FA)-based, one-time password (OTP) techniques, which use basic unique individual identification factors for authentication, have done much to secure end users. Most 2FA uses the knowledge factor and the possession factor.

If 2FA is not enabled, the enterprise server typically monitors unusual sign-in attempts (such as one originating from a new device located in a different country or continent), or from a location that is not the normal location of the device. If the location is considered suspect, the server may prompt the user to confirm their account. The server may send a verification code or a request to change the password to an existing backup email address that was previously configured for that account. However, even receiving and entering such a code and answering all the additional security questions may not be enough to confirm user identity.

2FA adds an additional factor: typically a one-time code sent to, or generated on, a user's mobile device when a user logs in to his/her account from a new device or location. Someone trying to break into a user's account needs to not only steal the password but also, in theory, have access to the mobile device when they try to log in. 2FA is a better way to protect online accounts.

Thus, 2FA provides an extra layer of security to keep the data safe irrespective of the strength of the password. But a 2FA setup—which for most users requires a temporary code generated on, or sent to, a phone in addition to a password—is not necessarily bulletproof. This is especially so if that second factor is delivered via text message.

There are various 2FA adaptations. In one adaptation, the server sends a message to a mobile device via SMS when someone tries to log in or a voice mail code on any phone. Even if one uses a dedicated app on a phone to generate codes, there is a good chance that the service provider offers to let people log in by sending an SMS code to one's phone. Or, the service may allow you to remove the 2FA protection from your account after confirming that you have access to a phone number that you configured as a recovery phone number.

The rationale for text-based SMS or a voicemail-based code is quite simple. A cell phone has a unique phone number, and it has a physical SIM card inside it that ties it to that phone number with the cell phone provider. However, the phone number is not as secure as one would like to believe.

For example, an attacker may call the cell phone company's customer service department and pretend that the cell phone was lost. The phone company may ask some personal details about you—for example, credit card number, last four digits of a SSN, and others—that regularly leak in big databases and are used for identity theft. The attacker can try to have your phone number moved to their phone. There are even easier ways. For example, the attacker can have call forwarding set up on the phone company's end so that incoming voice calls are forwarded to their phone. Thus, the phone number becomes the weak link, allowing the attacker to remove two-step verification from the account or for the attacker to receive the two-step verification codes via SMS or voice calls. It is not just about the phone number, either. Many services allow 2FA to be removed if the phone is lost. As long as you know enough personal details about the account, you may be able to gain access. Indeed, some experts claim that 2FA using SMS text messages or voice mail based codes is not technically 2FA at all.

Fake cell phone towers known as International Mobile Subscriber Identity (IMSI) catchers or "stingrays" can also intercept text messages. The security community has identified weaknesses in SS7, i.e., the protocol that allows telecom networks to communicate with each other. Hackers can exploit SS7 to spoof a change to a user's phone number, intercepting their calls or text messages.

These attacks are not exactly easy to pull off, and likely require the attacker to figure out the user's cell phone number in addition to the password that they have stolen, guessed, or reused after being compromised in a data breach from another hacked service. But for anyone who might be a target of sophisticated hackers, all of those techniques mean that SMS should be avoided when possible for anything login-related.

The other adaptation of 2FA is technology such as Google Authenticator, which generates a unique Time-based One-time Password (TOTP) or code on a mobile device that matches one generated simultaneously on a web service's server. Based on some crypto tricks, this approach does not involve any communication between the server and the mobile device. A TOTP verifies user identity based on a shared secret. This secret must be shared online between the user and the provider. When logging into a website, the user device generates a unique code based on the shared secret and the current time. The user then manually submits this code as the second factor. The server generates the exact same thing based on the same secret in order to compare and validate the login request. Both sides generate the same hash from the same input factors, and share a secret at registration.

Apps such as Google Authenticator generate one-time-password (OTP) codes that change every few seconds. Those same exact codes are generated on the servers run by services like Slack, WordPress, or Gmail, so that the user can generate the code to prove their identity without it ever being sent over the internet. When the user signs up for the service, the Google Authenticator app and the server both start with a seed value that is transformed into a long, unique string of characters with a "hash", i.e., a mathematical function that cannot be reversed. Then, that string of characters is hashed again, and the results are hashed again, repeating every few seconds. Only a few digits of those characters are displayed as the login code, so that no one who glances at a user's phone can start their own hash chain.

While TOTP is simple to use, it has certain shortcomings. The user and the provider server share the same secret. If an attacker is able to hack into the provider server and is able to obtain the password and the secret database, the attacker can access all the accounts. Additionally, the secret is displayed in plain text or as a QR code. This also means that the secret is most likely stored in plain text form on the server of the provider. Basically, one needs to trust that the provider can protect the secret.

Most OTP systems are susceptible to real-time replay and social engineering attacks and are also indirectly susceptible to man in the middle (MITM) and man in the browser (MITB) attacks. A real-time replay attack is a form of an MITM attack. In this attack, malware sitting on the browser captures the user credentials. The malware forwards these details to the attackers, and simultaneously blocks the user request. The user receives an error message which reports a failure. The attacker can perform an immediate replay with the same credentials. These tokens are usually valid for 60 seconds.

There have been reports where a vendor stored the seeds for all its released tokens, and its servers were compromised. With the OTP generation algorithm being public, the attackers could derive OTPs for leaked seeds.

There are other adaptations of 2FA. For example, in Google's Prompt, a second-factor login prompt is sent directly from its servers to Android phones or to the Google Search app for iOS. Google Prompt works by pushing an interactive verification prompt through GCM (Google Cloud Messaging), which is available on Android devices as part of Google Cloud Platform and on iOS devices as part of the Google app. Being a simple "Yes" or "No" message delivered to a trusted device does not require opening an app or entering codes. If the user cannot receive the prompt, they can easily select a different authentication method (e.g., a code generated in the authenticator app or delivered in a text message). Users cannot respond to Google Prompt on locked devices.

In addition to TOTP, another approach is based on a Universal Second Factor (U2F). The U2F standard was created by the FIDO Alliance. U2F uses public key cryptography to verify user identity. In contrast with TOTP, users are the only one to know the secret (i.e., the private key). The server sends a challenge, which is then signed by the secret (private key). The resulting message is sent back to the server, which can verify the identity by using the user's public key in its database.

There are several benefits of using U2F authentication. There is no shared secret (private key) sent over the internet at any time. Because there is no secret shared in U2F and no confidential databases stored by the provider, a hacker cannot simply steal the entire databases to gain access. Instead, the attacker needs to target individual users, and that is much more costly and time-consuming. U2F is easier to use because no retyping of one-time codes is involved and no personal information is associated with the secret.

In one approach, the U2F protocol has been implemented using a USB token device that features a button to activate the device. The server sends a challenge request to the client's web browser, and then the browser sends the request to the USB device. The USB device lights up, prompting the user to push the button to activate the device. Once activated, the device signs the challenge and returns the signed data back to the browser, which forwards it back to the server. The USB-only tokens are only useful for computers; this prevents their use on mobile devices. There are a few U2F devices on the market now that use NFC or Bluetooth in addition to USB. Adoption of the U2F standard is accelerating with many web services are using it, such as Facebook, the entire Google platform, Dropbox, and GitHub.

When applied, the U2F standard ensures that 2FA is used for login security by requiring both a knowledge factor (password) and a physical factor (USB key or token) in order to authenticate access to a secured account or service. It also ensures that access is granted only after verifying that the login site or service is truly a legitimate property.

However, U2F is not going to solve all cybersecurity problems, but it is certainly a step in the right direction. For example, researchers recently uncovered some flaws in the USB design specifications that may leave firmware unprotected and potentially allow attackers to overwrite firmware and take control of USB devices. This firmware vulnerability could allow USB devices to be reprogrammed to steal the contents of anything written to the drives and spread malicious code to any computer to which these devices are connected. Much like self-replicating computer viruses that once spread through the insertion of floppy disks into disk drives in the past, USB malware can potentially infect systems and easily replicate itself and spread to other devices. These dangers are underscored by the fact that they are essentially undetectable. Currently, there is no process in place to check or confirm authenticity when a device's firmware is flash upgraded. Since these changes occur at the firmware level, antivirus or malware tests cannot detect such malicious code.

Of course, some USB devices do not have reprogrammable firmware, so not every device may be vulnerable in this way. However, users are ultimately at the mercy of manufacturers. While some do not use reprogrammable firmware, it is always technically possible for malicious code to be injected into USB devices at the manufacturing stage. Even if the firmware is intact, USB is still highly vulnerable because an otherwise 'clean' and uninfected USB device can potentially become infected by being connected to a computer that has been compromised by malware. So, even if a USB device's firmware is intact, it can potentially be infected without the user's knowledge, and the user may unwittingly connect that device to additional systems which can subsequently be compromised. Thus, the potential risks of USB technology are not limited to firmware vulnerabilities only. The mere use and availability of USB connections and devices poses similar, disturbing data security risks.

Infected USB devices can behave maliciously. For example, a USB device can emulate a keyboard and issue its own commands, including instructions to install malware or steal files; a USB device can pretend to be a network card and change a computer's domain name system setting, which can secretly redirect your web browsing traffic; a USB device can install malicious code that acts as a man-in-the-middle and secretly spies on communications as it relays them from a compromised machine; or a USB thumb drive or external hard disk can infect connected computers at boot up, before antivirus tools can detect it and intervene.

In another approach to defeat USB authentication, a researcher used a small microcontroller to evade various security settings on a real system, opened a permanent backdoor, disabled a firewall, and controlled the flow of network traffic, all within a few seconds and permanently, even after the device has been removed.

The mere act of connecting a USB device to a machine can potentially lead to malware infection and a data security breach. This is why experts such as the United States Computer Emergency Readiness Team (US-CERT) recommend that users never connect USB devices to untrustworthy machines such as public computer kiosks and never connect them to home or enterprise systems unless they know and trust every connection that the device has ever made. This is why most defense agencies and defense contractors only buy computers that do not have any USB connections. Their employees thus cannot use USB authentication.

Instead of using the knowledge factor and the possession factor, one can also use the third factor such as a biometric factor, which is something that the user is, such as his or her fingerprints, eye scan, or voice pattern. While the biometric factor is the most convincing way to prove an individual's identity, it has several drawbacks. Biometric authentication is a "what you are" factor and is based on unique individual characteristics. Physical biometrics includes DNA, fingerprints, facial recognition, and eye scans (iris, retina). Behavioral biometrics includes voice recognition and handwritten signatures.

However, biometric authentication systems are not 100% accurate. Environment and usage can affect biometric measurements. They cannot be reset once compromised and you cannot revoke the fingerprint, eye scan, or voice print remotely. A thief could steal the smartphone, create a fake finger, and then use it to unlock the phone at will. It has also been found that master fingerprints can trick many phones and scanners.

When a fingerprint is registered in a device, the device asks for multiple presses from different angles. These samples are then used as the original data sets to compare with subsequent unlock attempts. Since smartphone sensors and other mobile device sensors are small, they often rely on partial matches of fingerprints. Researchers have discovered that a set of five master fingerprints can exploit these partial matches, and open about 65% of all devices. Since there is no way to modify your iris, retina, or fingerprint, once somebody has a working copy of these, there is not much you can do to stay safe.

In one of the biggest hacks ever, the US Office of Personnel Management leaked 5.6 million employee fingerprints. For the people involved, a part of their identity will always be compromised. Unlike passwords, fingerprints last a lifetime and are usually associated with critical identities. Thus, the leakage of fingerprints is irredeemable.

A couple of years ago, a security researcher discovered weaknesses in the software that allowed Android devices to be compromised, allowing them to remotely extract a user's fingerprint, use backdoors in the software to hijack mobile payments, or even install malware. What is more, they were able to do this remotely, without having physical access to the device. Creating a fake fingerprint is not that difficult. An attacker can lift a fingerprint from the phone or any other place, place it on a plastic laminate, and then cast a finger to fit this mold. Once the malicious hacker creates the fake finger, all he has to do is to place it on the scanner, press with his finger to conduct electricity, and then use the unlocked phone.

Tricking an eye scanner may require taking a photo with a cheap camera in night mode, or getting access to the hacked data from a site that stores the eye scan data. After printing the eye on paper, a wet contact lens is put over it to mimic the roundness of the human eye.

At times, third party authentication services are used to authenticate a user. For example, OpenID is a way of identifying a user, no matter which web site they visit. Web sites that take advantage of OpenID need not ask for the same information over and over again. A user only gives the password to the OpenID provider, and then the OpenID provider assures the identity of the user to the websites a user is visiting. No website other than the OpenID provider ever sees the password, so a user does not have to worry about an insecure website compromising his/her identity. Thus, OpenID simplifies login, With OpenID, a user only has to remember one user name and one password. However, Open ID alone does not guarantee security, because it still remains the single point of failure. The other approach used by some websites is OAuth for authorization and partial authentication.

OAuth is an open standard for authorization and allows delegated authorization of devices, APIs, servers, and applications with access tokens rather than credentials. A user grants permission to access his/her data on some website to another website, without providing this website the authentication information for the original website. OAuth does not validate a user's identity but provides authorization to see what permissions an existing user already has. There are various modes of authorizations called grant types depending on the service or applications. Basically, OAuth is a protocol that supports authorization workflows and provides a way to ensure that a specific user has permissions to do something.

Both protocols provide a way for a site to redirect a user somewhere else and come back with a verifiable assertion. OpenID provides an identity assertion while OAuth is more generic in the form of an access token which can then be used to "ask the OAuth provider questions". However, they each support different features. They share a common architecture in using redirection to obtain user authorization. In OAuth, the user authorizes access to their protected resources, and in OpenID to their identity. However, that is all they share. At their core, both protocols, OpenID and OAuth, are assertion verification methods. OpenID is limited to the 'this is who I am' assertion, while OAuth provides an 'access token' that can be exchanged for any supported assertion via an API.

Because the identity provider typically (but not always) authenticates the user as part of the process of granting an OAuth access token, it is tempting to view a successful OAuth access token request as an authentication method itself. However, because OAuth was not designed with this use case in mind, making this assumption can lead to major security flaws.

The OAuth communication protocol is not secure and the user can be improperly tricked such that an attacker can obtain his/her credentials. Thus, OAuth should be used only if it is actually needed. For example, building a service where it needs to use a user's private data that is stored on another system.

Similarly, OpenID is an authentication protocol where a third party provides authentication for all other sites without sharing the user name and password with each site. OAuth is an authorization protocol where credentials can be shared and permission can be granted and some data can be shared with other sites through the use of tokens. However, both of these approaches are subject to security breaches.

Therefore, sophisticated attackers are capable of breaking the present multifactor authentication and the third party ID provider's services. Thus, there is a clear need to come up with a better approach to secure physical and digital assets from cyber attacks, hacking, and heists while providing authentication and authorization in a secure manner and preferably through a single protocol without sharing a user name other than with the authentication site.

In addition, there have been numerous cases of fraudulent transactions involving credit/debit cards, ATM cards or ID cards. Most credit cards now incorporate an electronic chip on the card known as an EMV (Europay, MasterCard, and Visa) chip to prevent counterfeiting. Using an EMV Chip+ PIN at the physical Point Of Sale (POS) reduces card-present (CP) fraud significantly but does not address the fraudulent use of payment data when there is no direct connection between the chip reader and the card, such as when the data is entered into an e-commerce application. Such fraud, termed card-not-present (CNP) fraud, remains an increasing problem.

The advantages of chip cards over magnetic stripe cards are many and have reduced CP fraud significantly in countries that have adopted it. The card's chip may or may not operate in conjunction with a PIN. If used with a PIN, it provides 2FA that combats the use of lost or stolen cards. A cryptogram in the chip authenticates the card's validity and the PIN entry validates that the person using the card is the cardholder. The smart chip in the card must connect with a reader in the point-of-sale (POS) terminal. The connection can either be physical (i.e., touching) or wireless using near-field communication (NFC) technology over distances of a few inches. However, as mentioned above, it does not address CNP transactions because the user normally does not have access to a chip reader.

One possible solution to prevent CNP fraud is for consumers to purchase an EMV-compliant card reader to use for authenticating a credit or debit card for online purchases or banking sessions. However, this requires the consumer to outlay their own money, and makes completing online transactions more difficult. This is especially true with the rise of mobile transactions, where a user would need to carry an extra device with them at all times in order to access their accounts. It is also possible that an NFC card reader could be built into or attached to devices such as desktop computers, tablet computers, or mobile devices in the future. However, this is reliant on manufacturers creating such devices and on users then purchasing these devices.

Other proposed authentication mechanisms to fight CNP fraud include Short Message Service (SMS) authorization codes and Universal Serial Bus (USB) security tokens. However, these too suffer from the same problems that were described with 2FA in accessing websites or other digital assets.

None of the above approaches are satisfactory to prevent CNP credit card fraud. It would be ideal if a person can carry only one UIAK in the form of a card, key fob, or single identifying article that serves many purposes in addition to allowing access to a website. This UIAK can serve as a credit/debit card, health card, ID card, government benefit card, loyalty card, bank card, etc. and can also be used as an item that allows user to access websites or servers with or without a password.

In addition, cryptocurrencies, such as bitcoin based on computational algorithms, are gaining ground lately. They can be used to purchase goods and services and exchanged for conventional currencies. As cryptocurrencies are mined, they need to be stored. In order to spend the bitcoin, two pieces of information are needed: the public information and the private or secret information. The public information identifies the identity of the coin and its worth and goes on the block chain. The public key is also the address of the bitcoin or currency where the coin needs to be sent. The secret information is the private key of the owner. The private key must be kept secret and protected.

In order to manage the private key, three considerations must be kept in mind. First, the availability to spend the cryptocurrency when needed; second, the convenience of managing the key; and third, the security of the key, are some of the key criteria to manage. One way to manage the private key is to store it on a file on local storage media, such as a mobile phone or a computer hard disk or any other device under the control of the owner. It is easily available and convenient to manage. However, if the storage media is lost or stolen, or becomes infected with malware, the currency will be lost.

Theft of cryptocurrencies is not uncommon. In February 2014, cryptocurrency made national headlines due to the world's largest bitcoin exchange. Mt. GOX, declaring bankruptcy because it lost nearly $473 million of their customer's bitcoins, likely due to theft. In 2013, two agents from the Drug Enforcement Administration and U.S. Secret Service were charged with wire fraud, money laundering, and other offenses for allegedly stealing bitcoin during the federal investigation of Silk Road, an underground illicit black market.

Thus, storing cryptocurrencies on a computer or local devices known as hot storage is fraught with dangers. Also, any device connected to the internet is subject to being hacked and thus not secure. One way to manage this is to store the cryptocurrencies offline or what is called cold storage. Cold storage is not connected to the internet. This may not be convenient, but it is more secure. In this manner, one can keep some currency in hot storage for convenience, but most of it in cold storage for security. One can move currency between cold storage and hot storage and vice versa.

In order to manage hot and cold storage, the private keys must be different for each storage. Otherwise, hacking the hot storage private key will also compromise the cold storage private key. Each side also will need to know the public addresses in order to move the cryptocurrencies. There are various ways to manage the addresses for cold and hot storages and moving the currency back and forth.

However, if the private keys of the hot storage or cold storage are hacked, the cryptocurrency will be lost forever. Most of the keys are stored in a single place, whether in a safe, in software, on paper, in a computer, or in a device. This creates a single point of failure. If the single point of failure is compromised, then it becomes a problem. While there are ways to avoid single points of failure by splitting the key secrets and storing them at different places, it does create inconvenience and extra overhead.

DETAILED DESCRIPTION OF THE PREFERRED EMBODIMENTS

Figure 1:
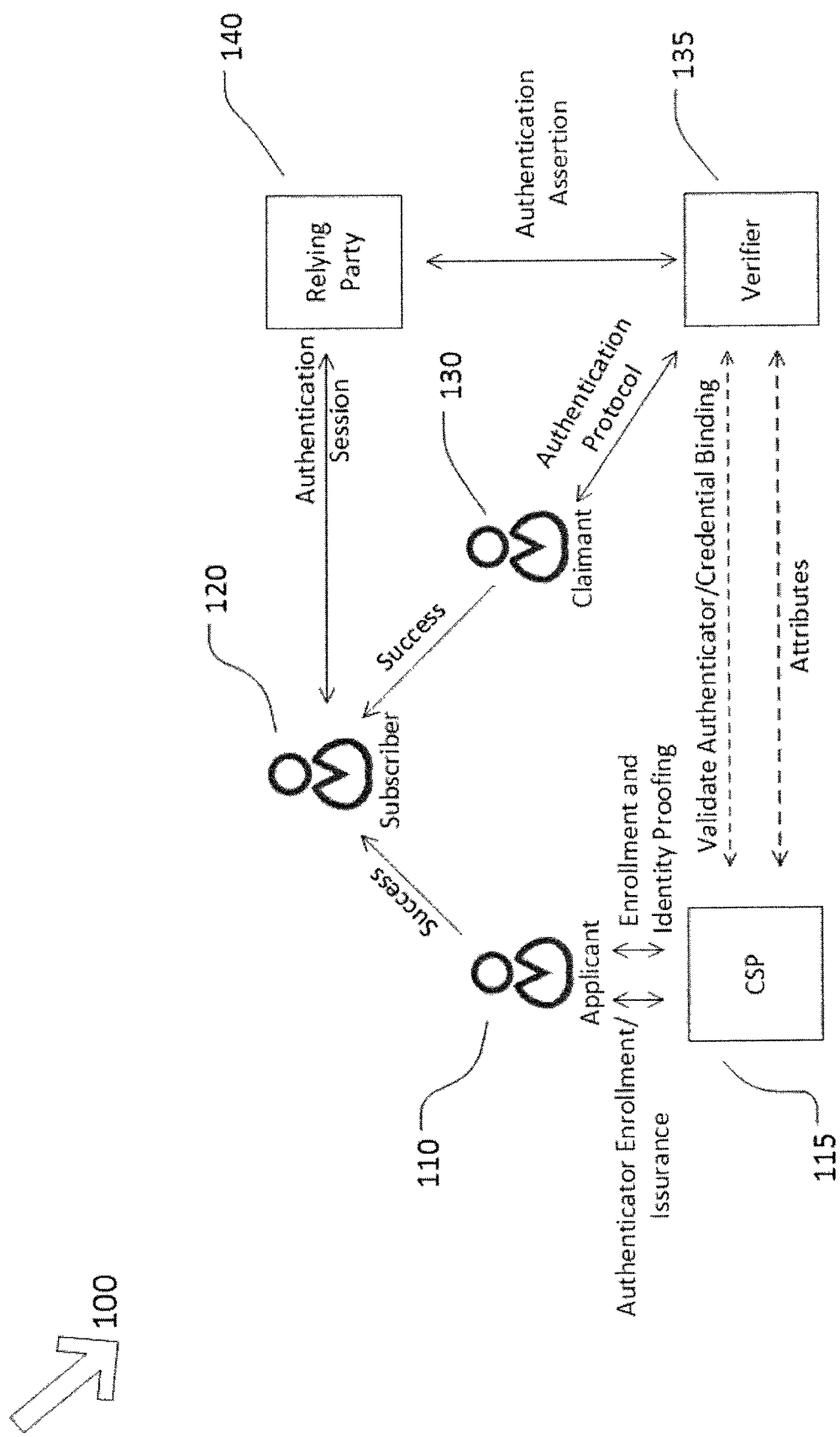
FIG. 1 is a diagram of a basic framework of an authentication process.

The American National Institute of Standards and Technology (NIST) has described a basic framework 100 on how the authentication process can be accomplished. As shown in FIG. 1, the first step requires the enrollment process of an individual or applicant 110 applying to a Credential Service Provider 115 (CSP). The CSP 115 confirms the applicant's identity and the individual receives a token and/or a credential, which may be in the form of a user name. The individual 110 then becomes a subscriber 120.

The CSP 115 manages the credential along with the subscriber's 120 enrollment data for the life of the credential. When an individual claimant 130 wants access to a service provider or a Relying Party 140, he/she has to prove their identity as a subscriber 120. The relying party 140 (RP) is a computer term used to refer to a server providing access to a secure software application. Verifier 135 is the party that verifies the claimant's 130 identity. The verifier 135 and the CSP 115 may be the same entity; the verifier 135 and the relying party 140 may be the same entity; or they may all be three separate entities. Where the verifier 135 and the relying party 140 are separate entities, the verifier 135 must convey the result of the authentication protocol to the relying party 140. As described earlier, the verifier 135 may be a third party authentication provider that confirms the identity of the user or claimant 130 for access to the relying party 140 server. OAuth and OpenID may act as the verifier 135 entities.

Figure 2A:
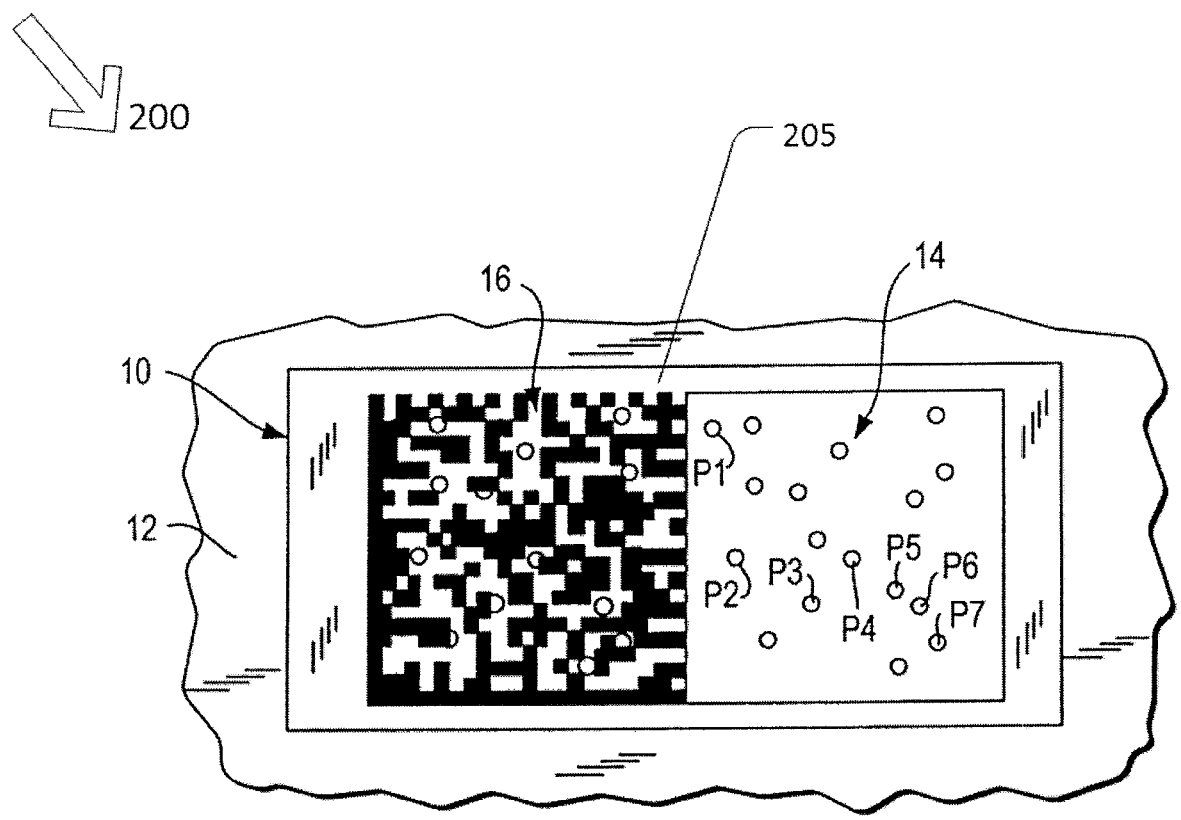
FIG. 2A is a top plan view of an authentication tag used in the authentication process.
Figure 2B:
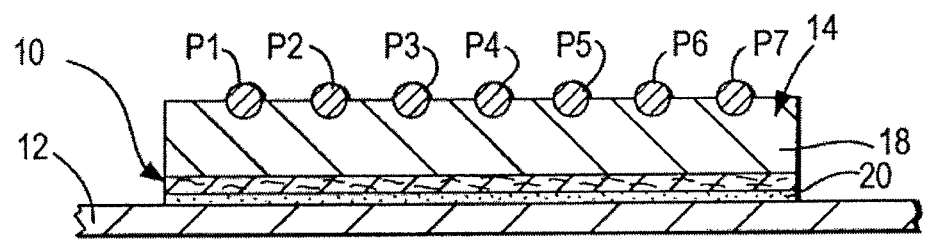
FIG. 2B is a sectional view of the authentication tag of FIG. 2A.

FIG. 2A and FIG. 2B show a top plan view and a sectional view, respectively, of an authentication tag 10 on an object 12 to be authenticated, in a system 200, as described in U.S. Pat. No. 9,082,062 B2, the entire contents of which are incorporated herein by reference thereto. In brief, the tag 10 includes a first dataset 14 configured as a random distribution of three-dimensional elements P1, P2, P3, P4, P5, P6 and P7 on the object 12, and a second dataset 16 configured as data elements.

The data elements of the second dataset 16 are preferably also affixed to the object 12, either adjacent to, or superimposed on, the first dataset 14. The data elements of the second dataset 16 are machine-readable, for example, they can be light-reflective. Advantageously, the second dataset 16 is a barcode symbol printed on the tag 10, but could also be a serial number of alphanumeric characters, or an RFID tag, or a magnetic stripe. There could be different embodiments of the second dataset 16. For example, instead of a barcode as the second dataset, it could be a serial number, or alphanumeric characters in an RFID tag, or the second dataset may be comprised of bars, dots, or other shapes and characters. In an RFID tag, numerical or alphanumeric characters can be stored in an RFID chip. The first dataset 14 may then be incorporated over the RFID tag. The second dataset 16 in the RFID chip may be encrypted, and the decryption key can be limited to devices that can read it.

FIG. 2A and FIG. 2B show the datasets 14 and 16 on the same tag 10 that is advantageously configured as an adhesive label. However, datasets 14 and 16 can also be directly incorporated in any object 12 or article. The datasets 14 and 16 together constitute a Unique Identity and Authentication Key (UIAK) or key 205 on the object 12. The key 205 can be affixed to the object 12 in situ. The key 205 is associated with the object 12 to be authenticated, and any object may be authenticated. Preferably, the label has a substrate, e.g., paper, foil, or film, and an adhesive layer 20 on the underside of the substrate for adhering the key 205 to the object 12.

The three-dimensional elements P1, P2, P3, P4, P5, P6, and P7 of the first dataset 14 are configured as a plurality of light-modifying particles and/or bubbles and that can have any shape, color, material, interior structure (hollow or solid), size, or number. The three-dimensional P1, P2, P3, P4, P5, P6, and P7 can be of different geometrical shapes, such as rectangular, triangular, circular, or oval areas, on the label. The three-dimensional elements can be mutually spaced apart or contact one another. The three-dimensional elements can be deposited in a single layer or in multiple layers on the label, or can be partially or fully embedded in a curable medium 18, and may be overlaid with a transparent overcoat for protection. Such three-dimensional elements have characteristic colors, for subsequent image processing and analysis. The three-dimensional elements are either applied to the label for the object 12, e.g., by being ink jet-printed on the label, or by being applied in the curable medium 18 on the label, or by being adhered to the label, or by being applied or adhered directly to the object 12, or by being applied or adhered directly to a card on the object 12. The light-modifying particles are either optically reflective or retro-reflective, or light-scattering, or light-absorptive over one or more different wavelengths to exhibit different colors.

A portable, handheld, image capture device is preferably aimed at the first and second datasets 14, 16 to capture return light from the three-dimensional elements and the data elements. The return light from the datasets 14, 16 can be captured simultaneously or consecutively. Advantageously, the image capture device is a mobile electronic device having a solid-state imaging module of the type conventionally found in consumer electronic digital cameras. The mobile electronic device is typically a cellular telephone or smartphone that has a built-in imaging module, but can also be a personal digital assistant (PDA), a tablet, a computer, an e-reader, a media player, or like electronic device having a built-in imaging module, especially one that is normally readily at hand to the average user. No special skill set is required for the user to capture the return light from the three-dimensional elements and the data elements by simply taking picture(s) of the three-dimensional elements and the data elements.

As described above, it is advantageous in several applications when the identifying information of the second dataset 16 is in the RFID chip, and when the first dataset 14 is applied over the RFID chip. For example, it may reduce the overall physical dimension of the resulting label, and the reading of the identifying information may not require a direct line of sight as is the case for capturing return light from a barcode with an image capture device. With the advent of nearfield RFID readers and nearfield RFID chips, the identifying information of the second dataset 16 can be captured with a mobile device, and the same mobile device can also capture the optical fingerprint information in the first dataset 14. Alternately, a fixed device that has an imager integrated into an RFID reader can also capture both the second dataset 16 information and also the fingerprint image in the first dataset 14.

Figure 3:
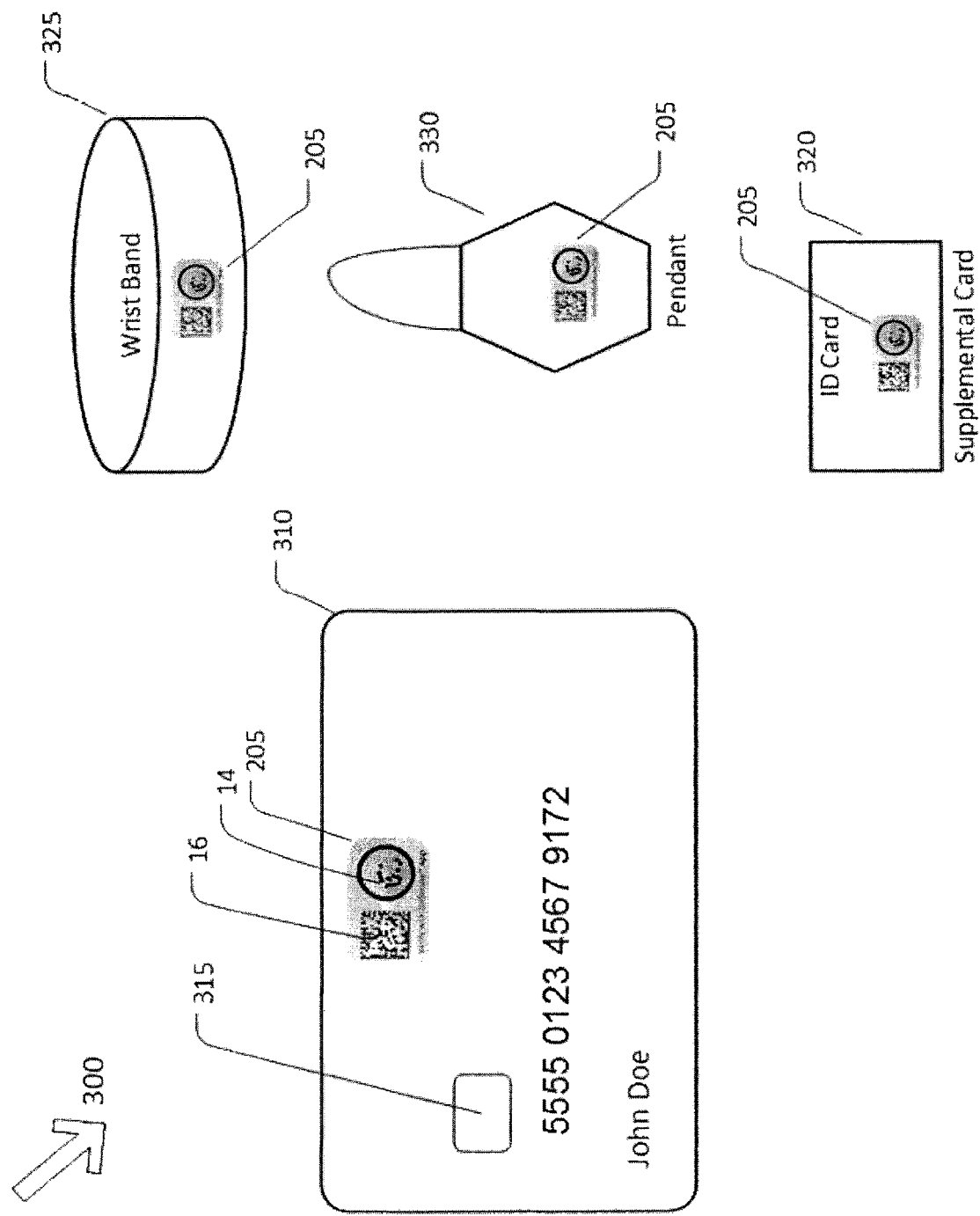
FIG. 3 includes views of various objects on which the authentication tag of FIG. 2A may be applied.

Reference numeral 300 in FIG. 3 shows another embodiment where the datasets 14 and 16 in the form of the key 205, are incorporated on a magnetic stripe card or an electronic chip-based card 310. The key 205 can be affixed either on the front of the card 310, or it could be affixed on the back of the card 310 at a suitable place so as not to interfere with an EMV (Europay, MasterCard, Visa) chip 315, or a magnetic stripe. The key 205 can be incorporated in the credit card manufacturing process itself.

The second dataset 16 can be associated with the information in the magnetic stripe or the EMV chip 315. For example, in a credit card that has the EMV chip 315, and a magnetic stripe, the datasets 14 and 16 can be embedded in, or attached to, the credit card 310, and the information in datasets 14 and 16 can be associated with the card number or other information in the chip 315. Alternately, the dataset 16 can be encoded in unencrypted or encrypted form in the magnetic stripe or the chip 315 with the decryption key in a reading device. The reading device can be a fixed device or a mobile device that reads the identifying information in the second dataset 16 in the barcode or the chip 315 or the magnetic stripe, and also captures the optical information of the first dataset 14.

In other embodiments, the datasets 14 and 16 can be incorporated in, or affixed to, any identifying document that a person has. For example, as also shown in FIG. 3, the key 205 can be attached to an ID card 320 that a person carries with him/her. The key 205 can also be affixed to a wrist band 325 or a pendant 330. Alternately, any item that a person owns can be made unique by affixing the key 205, and then, that item becomes a passport to access digital assets, websites, servers, or to use as a credit/debit card.

As described in U.S. Pat. No. 9,082,062 B2, any object 12 may be authenticated by creating an authentication pattern signature for the object 12 to be authenticated, associating a random distribution of the three-dimensional elements P1 . . . P7 with the object 12, aiming a portable, handheld, image capture device at the object 12 to capture return light from the elements P1 . . . P7 as one or more images, verifying from the image(s) that the elements P1 . . . P7 are three-dimensional, processing the image(s) to generate an image pattern of the elements P1 . . . P7, comparing the image pattern with the authentication pattern signature, and indicating that the object 12 is authentic when the image pattern matches the authentication pattern signature.

The authentication pattern signature for the key 205 may be stored in an addressable database remotely from the key 205. The database stores a multitude of other authentication pattern signatures for other keys. When read, the second dataset 16 serves as an address identifier that identifies an address for the authentication pattern signature in the remote database, thereby enabling the database to be interrogated only at that address, rather than having to interrogate every authentication pattern signature in the database. This greatly accelerates authentication and improves field performance.

The data elements of the second dataset 16 are machine-readable, for example, they can be light-modifying, as described above. When the data elements reflect and absorb light, the same image capture device that captured return light from the first dataset 14 can be used to capture light from the second dataset 16. The image capture device can capture and identify and authenticate the object 12 having datasets 14, 16 as combined in the key 205 as part of that object 12. No two objects 12 can have the same exact authentication pattern image.

If the authorization to scan the key 205 is only limited to the image capture device such as a smartphone of the claimant 130, then it guarantees that no fraudulent transaction can proceed. Since the captured optical fingerprint information in all transactions and the stored fingerprint in the remote database are encrypted, man-in-the middle attacks are also not possible.

Figure 4:
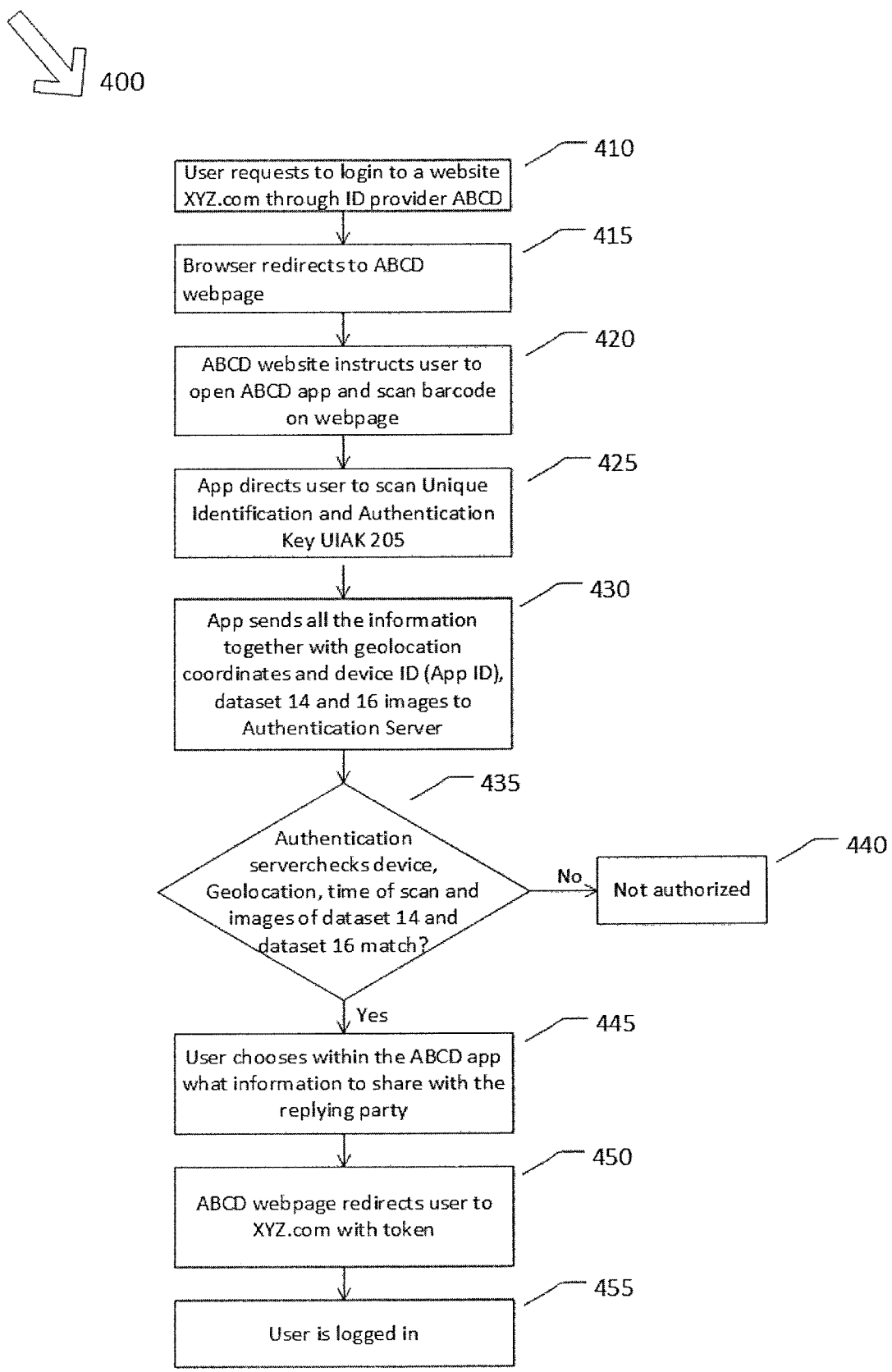
FIG. 4 is a flow chart depicting an authentication method in which a key on the authentication tag can be used to allow a user access to a website.

Reference numeral 400 in FIG. 4 is a flow chart that shows how the key 205 can be used to allow single sign-on (SSO) access to any website or relying party 140. The steps in accessing a website XYZ.com are shown; a similar process will apply for any digital asset or server. The user visits the website, in this case XYZ.com, and requests to login with identity provider ABCD in step 410. The user's browser redirects to the ABCD webpage in step 415. The ABCD website instructs the user to open the ABCD app and scan a barcode displayed on the webpage, which contains a unique session ID, in step 420. The app then directs the user to scan the key 205 in step 425. The app sends all information, including the key datasets 14 and 16, and geolocation data and the time of scan to an authentication server in step 430. The authentication server checks the mobile device ID, the key datasets 14 and 16, and the time of scan, and matches with the stored data in the authentication server in step 435. If any of these parameters do not match, then access to the website is denied in step 440. If all parameters match, then the ABCD app allows the user to choose what information (e.g., name, email address, phone number) to share with the relying party 140 in step 445. The ABCD webpage then redirects the user to XYZ.com with a token containing this information in step 450. In step 455, the user is logged in.

Figure 5:
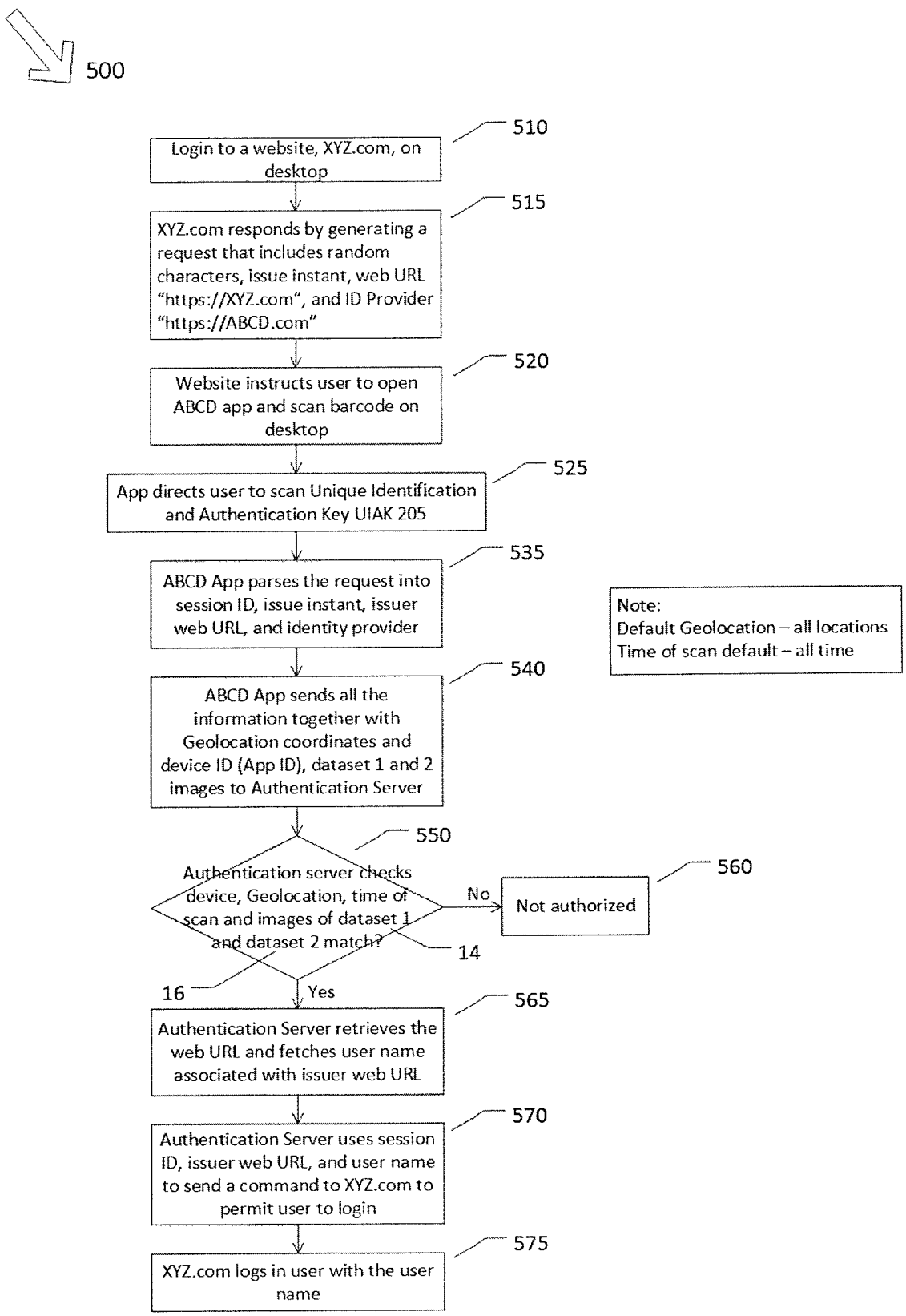
FIG. 5 is a flow chart depicting an authentication method in which a key on the authentication tag and other information from a mobile device can be used to allow a user access to a website.

Reference numeral 500 in FIG. 5 is a flow chart that shows how a digital asset, such as a website or server, can be accessed by the key 205 and an authorized mobile device. FIG. 5 illustrates how the website can be accessed on a desktop computer by using the key 205 associated with an ID card, credit card, key fob, or any article that has the key datasets 14, 16 incorporated into it. The same approach can be deployed for accessing any other digital asset. At step 510, a user attempts to login to a representative website XYZ.com on the desktop. At step 515, XYZ.com responds by generating a login request that includes information such as a session ID consisting of random characters, an issue instant that includes the time of the request, the web URL (XYZ.com), and an independent identity provider. All this information may be encoded in the form of a barcode displayed on the desktop, or displayed in the form of characters, numbers etc. For illustrative purposes, the identity provider in FIG. 5 is shown as ABCD.com.

Website XYZ.com also instructs the user to open the ABCD app in step 520 on the user's authorized mobile device. The user is also instructed to scan the barcode displayed on the website XYZ.com that was created in step 515 that includes information such as a session ID consisting of random characters, an issue instant that includes the time of the request, the web URL (XYZ.com), and an independent identity provider ABCD.com. The app then directs the user to scan the key 205 in step 525. In step 535, the ABCD app parses the login request into separate information pieces, such as the session ID, the issue instant, the website URL (XYZ.com), and the identity provider ABCD URL (ABCD.com). The app then sends all this information together with additional information, such as the geolocation coordinates, the time of the barcode scan, the device ID, and the images of the key datasets 14, 16 from the identity provider item to an authentication server in step 540.

In step 550, the authentication server checks that the identity item is unique and authentic by processing the images of the key datasets 14, 16. The authentication server then further checks that the device that is reading the identity item is the authorized device for the identity item. The authentication server also checks the geolocation coordinates of the device, the time of the barcode scan, and the issue time. If the device ID, the key 205, the geolocation coordinates, or the time during which the access is permitted do not match, then access to the website, server, or digital asset is denied at step 560.

The key 205 and the device together constitute the requisite pair of keys, and both of these keys are necessary for the system and process to work. One without the other will not allow the process to go forward. This establishes the identity of the user in a unique manner since the key 205 and the device belong to only one user. The key 205 cannot be cloned or reproduced as described in FIG. 2. The device such as a mobile phone is also unique to the user. Normally, the mobile device is further protected by a biometric, such as a fingerprint or eye scan, or by a passcode of multiple digits only known to the user. If the unique identity item is not authentic and/or if the device is not authorized to read it, then the user is denied access to the digital asset at step 560. In addition, in the authentication server database, one can also store the authorized time of the day and the days of the week for a user to access the digital asset, and the locations from where a user can access the digital asset. Even if the device ID and the unique identity item match, the authorized time for access and the authorized geolocation and the time duration permitted for access must also match for a user to access the digital asset.

The arrangement of matching the device and the unique identity item can be visualized as having two physical keys that are in the possession of the user. One physical key is the key 205 that has an identifier in the form of a barcode, RFID or alphanumeric characters as the second dataset 16, and that also has the first dataset 14 in the form of a random distribution of particles, as shown in FIGS. 2A, 2B. This key 205 cannot be compromised and cannot be hacked, and no virus can infect it as is the case with software-based keys or USB devices. The second physical key is the device itself, such as the cell phone or other imager-based device that is authorized to read the first physical key 205. Not all devices are permitted or authorized to read the key 205. The authorized physical reading device key is further protected by the biometrics or the digital passcode or facial recognition, and is assigned to the user and is unique to that user. Besides, both of these keys are in the physical possession of the user and cannot be hacked.

If the user lost the first physical key 205, then the person who finds the unique identity item does not have the device authorized to read it, and hence, the find is of no value without the device. If the person loses the device (e.g., the cell phone), then the finder of the device still cannot access the website or any server or other digital assets where the user has an account, because the finder does not have the correct key 205. In addition, as explained earlier, the access to a website, server or digital assets can be further controlled by assigning the geolocation coordinates from where access is permitted and also the time duration during which the website, server, or any digital asset can be accessed. If the user wants to access the digital asset from anywhere and at any time, he/she can have it as the default permission. In the default state, so long as the requisite pair of the correct key 205 and its associated authorized device match, a user can access the website, server, or any other digital asset where he/she has an account.

In step 565, the authentication server retrieves the web URL (XYZ.com) and fetches the user name for the web URL. The association of the user name that has been provided by the user to the website or to any digital asset where the user has an account and the UIAK is a one-time event, and this user name is then stored in the authentication server. No password needs to be stored in the authentication server. The key 205 and the associated mobile device substitute for the user name and password and also something that only the user has. The association and registration of the key 205 having datasets 14, 16 incorporated into it and the user's name that is stored in website XYZ or to any digital asset will be further explained in connection with FIG. 7.

In step 570, the authentication server uses the session ID, the issuer web URL (XYZ.com or any server or digital asset), and the associated user name to send a command to XYZ.com, or to the server or the digital asset to permit the user to log in. In step 575, the user is logged in with the user name. If the user so desires, a password can also be added in this process at a suitable step.

Figure 6:
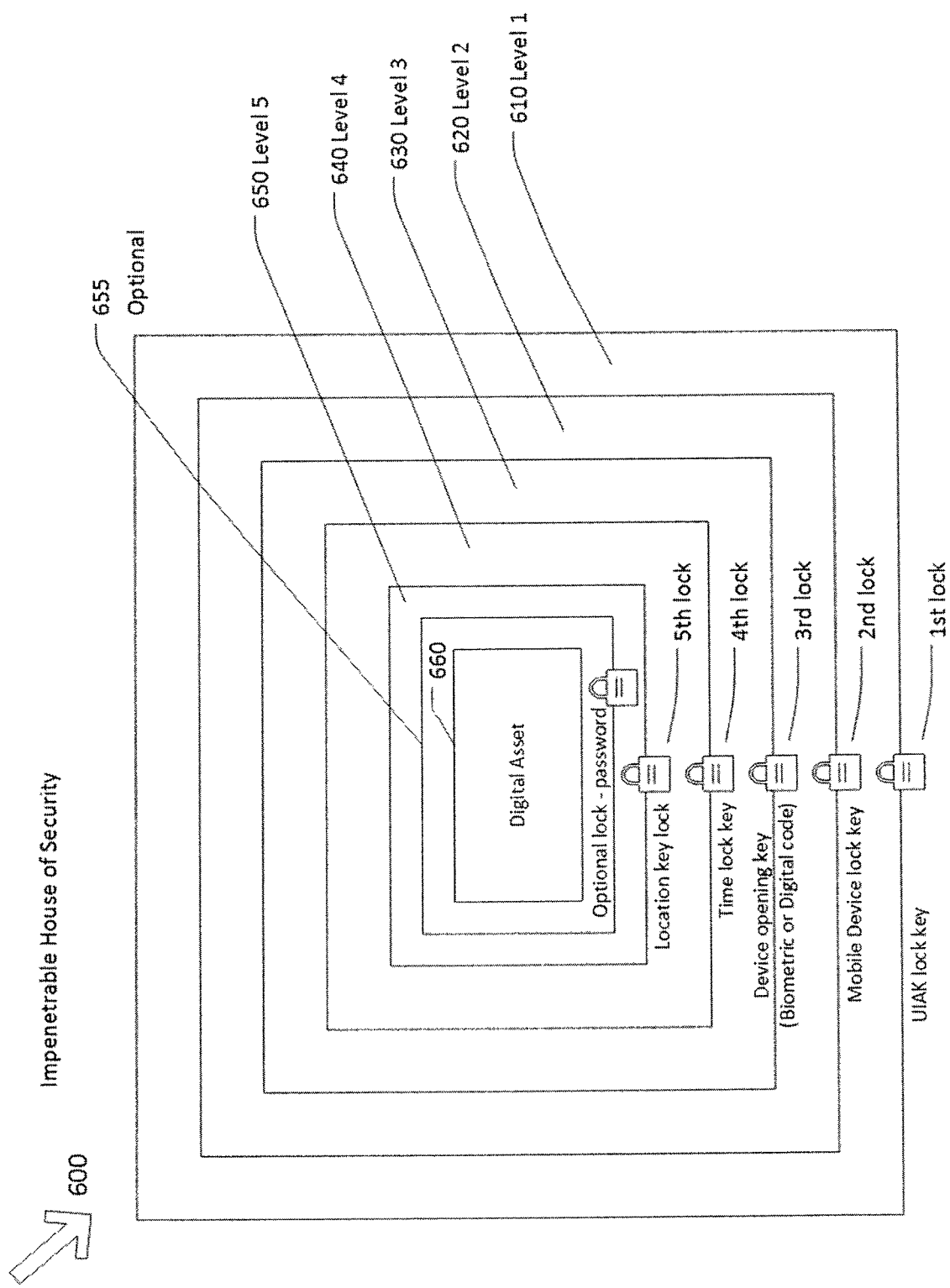
FIG. 6 is a diagram of multiple security levels used to protect a digital asset.

Reference numeral 600 in FIG. 6 is a flow chart that shows a so-called Impenetrable House of Security (IHS), as well as multiple levels of securities built into such a house before a user can enter a digital asset 660, such as a website or a server. A first lock typically needs user identification in a manner such that no one can imitate the user's identity. Typically, it is achieved either by a user name and a password, or by multifactor authentication, or by U2F, or by using USB devices, etc. as described above. However as described above, sophisticated attackers are capable of breaking the present multifactor authentication and the third party ID provider's authentication services. Therefore, there is a clear need to come up with a better approach to secure digital assets from cyber attacks, hacking, and heists while providing authentication and authorization in a secure manner and preferably through a single protocol without the user name and password other than the use of an authentication site.

In accordance with the present invention, the user's identity and password are all replaced by the physical unique identity and authentication item that has key datasets 14, 16 as an integral part. Once the user is confirmed by the digital asset (e.g., XYZ.com) either by user name and password, or by any other authentication means such as multifactor authentication, or by other approaches, and is associated with the datasets 14, 16 of the key 205, the user will not have to ever enter a user name or password again to log into the website. This association and registration is a one-time event in the beginning. Alternately, the digital asset 660 can have the user identified by the key datasets 14, 16 on the unique identity item at the time of establishing the account for the first time.

This physical possession of the unique item key 205 makes it very difficult for anyone to breach this first lock, because the key 205 is extremely hard to clone, if not impossible, and this key 205 is not prone to any virus or other types of attack. This level of security is labelled as level 1 security 610 in FIG. 6. Typically this first lock is the only lock that most digital assets (e.g., XYZ.com) have in the form of the user name and password before access is granted to a user. Once this first lock is breached, the hacker gets in and can cause havoc.

However, in accordance with this invention, there is at least one additional level lock that must also be breached. This level of security is labeled as level 2 security 620 in FIG. 6. As described above, the key 205 can only be used with the user's mobile device key. The device key is the mobile device of the user that has been specifically authorized to scan the first key 205. If a third party such as a hacker tries to scan the key 205, then the hacker's device will not work, and he/she will be denied the access. As described earlier, both the device key and key 205 must be operated together to access the digital asset 660.

Since most mobile devices are further protected either by biometrics such as fingerprints, or by eye scans, or by multi-digit passcodes. Unless the user uses one of these to open the mobile device, then the device cannot be used to scan the key 205. This level of security is labeled as level 3 security 630 in FIG. 6.

There are additional levels of security that are also provided for high security applications such as defense, financial, government, or other establishments where extremely high security is warranted. The level 4 security 640 in FIG. 6 limits the time during which the digital asset 660 can be accessed, such as weekdays from 8 AM to 5 PM, or any time desirable by the establishment. The access can be further controlled by assigning the geolocation coordinates from where the access is permitted as shown in level 5 security 650 in FIG. 6. The user may also add another optional level of security 655 in the form of something that only the user knows, such as a passcode or password.

In addition to the security levels provided in FIG. 6, the security can be further enhanced by having multiple keys 205 and multiple mobile devices in order to access the digital asset 660. This is especially applicable in highly secure applications. For example, two keys A and B may be provided, and one mobile device X may be authorized to read key A, and another mobile device Y may be authorized to read key B. In this example, only when this combination is used, will access be authorized to a server. An organization may have 3, 4, 5, or any number of keys and any number of authorized mobile devices to work with them. For example, one may require 2 out of 2, or 2 out of 3, or 3 out of 5 keys, to gain access to a server.

Hence, any digital asset, website, or server that uses a key 205 of the type described in FIGS. 2A, 2B that includes the datasets 14, 16, or the dataset 14 alone, or a combination of the datasets 14, 16, and any other modification coupled with only authorized device/devices that can read or decipher the datasets 14, 16 presents two impenetrable locks to safeguard the digital asset. Furthermore, the reading or deciphering device may also be protected by the user's biometric data, or by a multi-digit passcode, and thus puts another lock to protect the digital asset. Locks 4 and 5 for controlling the time of access and the geolocation coordinates from where the digital asset is accessible further protects it from any hacker or unauthorized user. One can also have a combination of multiple keys and associated devices to access the server or digital asset. This Impenetrable House of Security of FIG. 6 will reliably protect user privacy and assure him/her security of their data.

Figure 7:
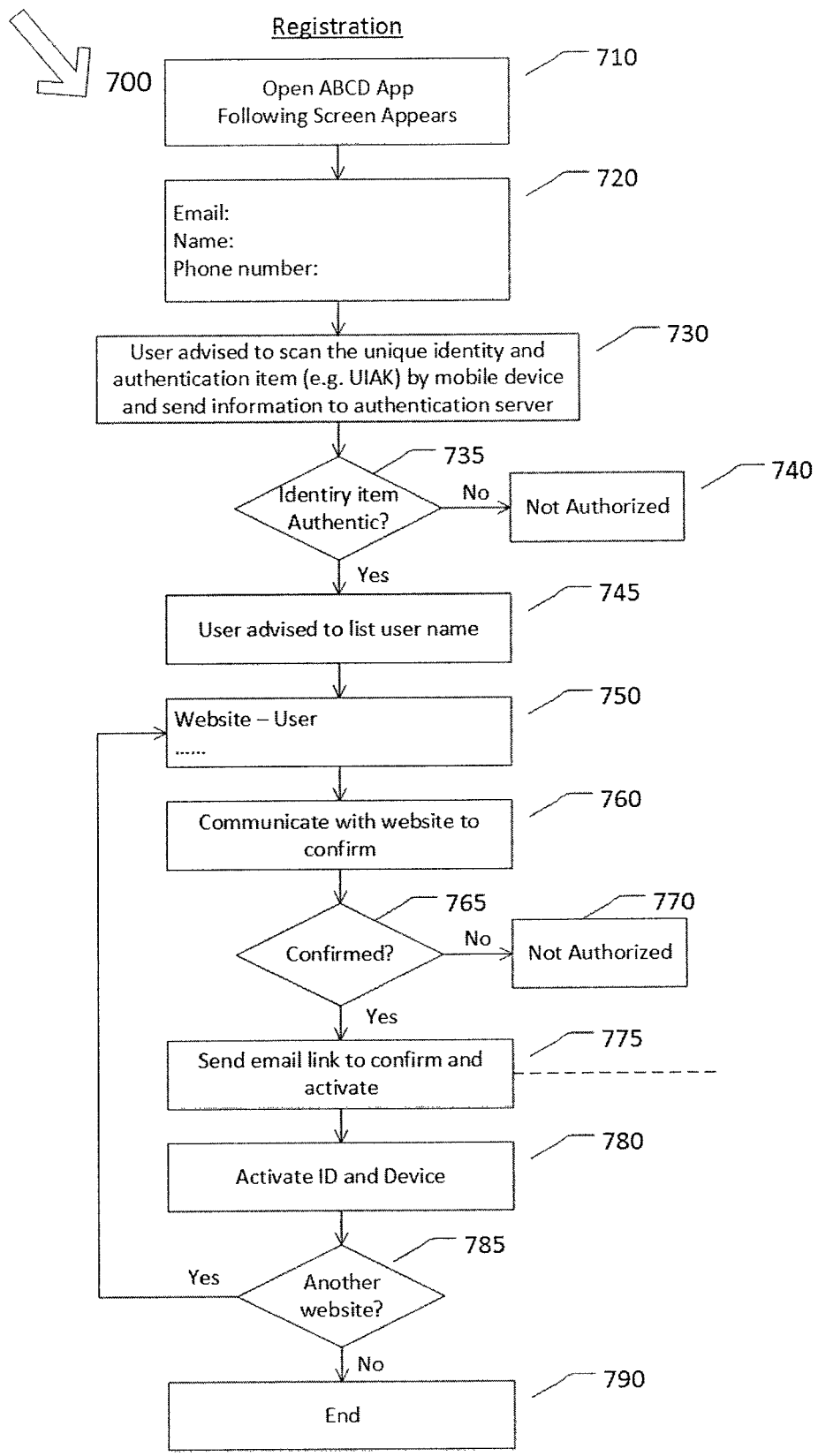
FIG. 7 is a flow chart depicting a registration method in which a key on the authentication tag can be used to allow user registration on a website.

Reference numeral 700 in FIG. 7 is a flow chart that depicts the registration, association, and activation of user names of a digital asset, a website or a server to a key 205. The registration and activation process can proceed in multiple ways. As shown in FIG. 7, in step 710, an ABCD app on a mobile device starts the registration process and requests from the user the name, the email address, and the mobile phone number of the user in step 720. The user is asked to scan the unique key 205 with the user's mobile device in step 730. This device will be linked to the key 205 and together this combination will form a pair. Also in step 730, the captured image of datasets 14, 16 will be sent to an authentication server. In step 735, the authentication server checks if the dataset 14 is three-dimensional in nature, has colored particles, and is associated with the dataset 16. If not, the user does not have a proper key 205, and the user will be denied access as in step 740 and advised to use the correct key 205. If the user does have the proper key 205, then the user is directed to list the user name for the website A that the user would like to login using the key 205 in step 745. In step 750, the user lists the user name associated with website A. The user name is communicated to website A in step 760 to confirm the user's identity. The user's identity can be confirmed by multiple ways in order to associate with the key 205 to start with initially. If the user's identity is not confirmed in step 765, then the user name does not belong to the person who is trying to associate that name with the key 205, and the permission is denied in step 770. If the user's identity is confirmed, then in step 775, an email link is sent to the email listed in step 720, or a text message is sent to the phone number listed in step 720. The user then activates the association of the key 205 and the mobile device to the user name in step 780 for that website or digital asset, and in the future will be able to log in without the user name or password at that site simply by using the key 205 and the associated mobile device. In step 785, the user is asked whether another user name at any other digital asset (e.g., website or server etc.) needs to be associated with the same key 205 and mobile device. If so, then the process starts again at step 750. If no further registration and activation is needed, then the process ends at step 790.

Figure 8:
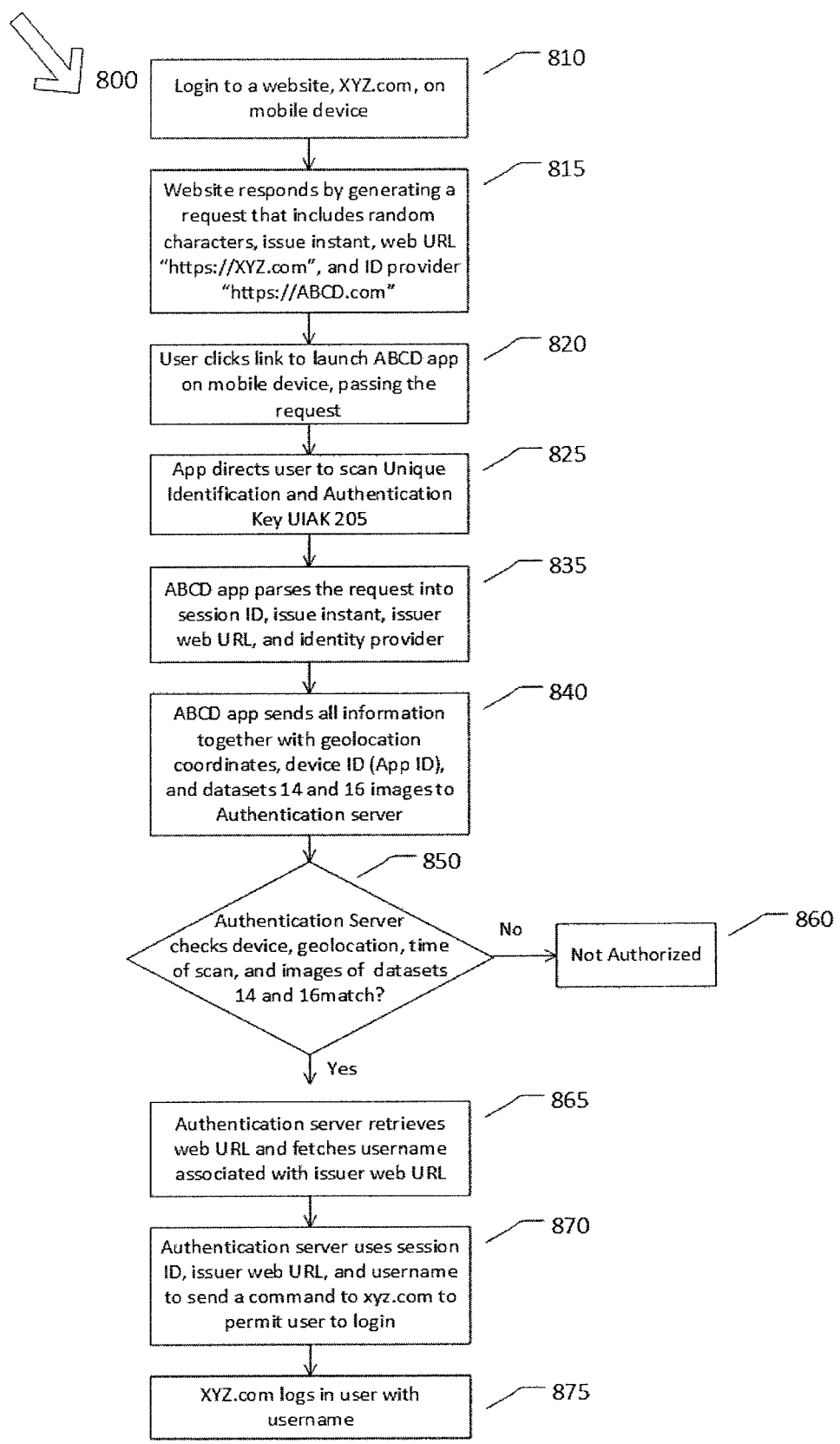
FIG. 8 is a flow chart depicting a method in which a key on the authentication tag and other information from a mobile device can be used to allow a user to login on a website using a user name.

Reference numeral 800 in FIG. 8 is a flow chart that depicts the access of a website or digital asset using the mobile device itself. A similar process will apply for any digital asset or server. The user visits the website, in this case XYZ.com, on the mobile device, e.g., a cell phone, in step 810. The website generates a request that includes random characters, the issue instant, the web URL, and the ID provider in step 815. The user clicks a link on the webpage to launch the ABCD app on the device, with the request information passed through this link, in step 820. The app directs the user to scan the key 205 in step 825. The app parses the request information from the website in step 835. The app sends this information and the key datasets 14, 16, as well as geolocation data and the time of scan to an authentication server in step 840. The authentication server checks the mobile device ID, the key datasets 14, 16, and the time of scan and then matches them with the stored data in the authentication server in step 850. If any of these parameters do not match, the access to the website is denied in step 860. If all parameters match, the authentication server retrieves the web URL and the user name associated with the web URL in step 865. In step 870, the authentication server uses the session ID, the web URL, and the user name to send a command to XYZ.com to permit the user to log in. In step 875, the user is logged in.

Figure 9:
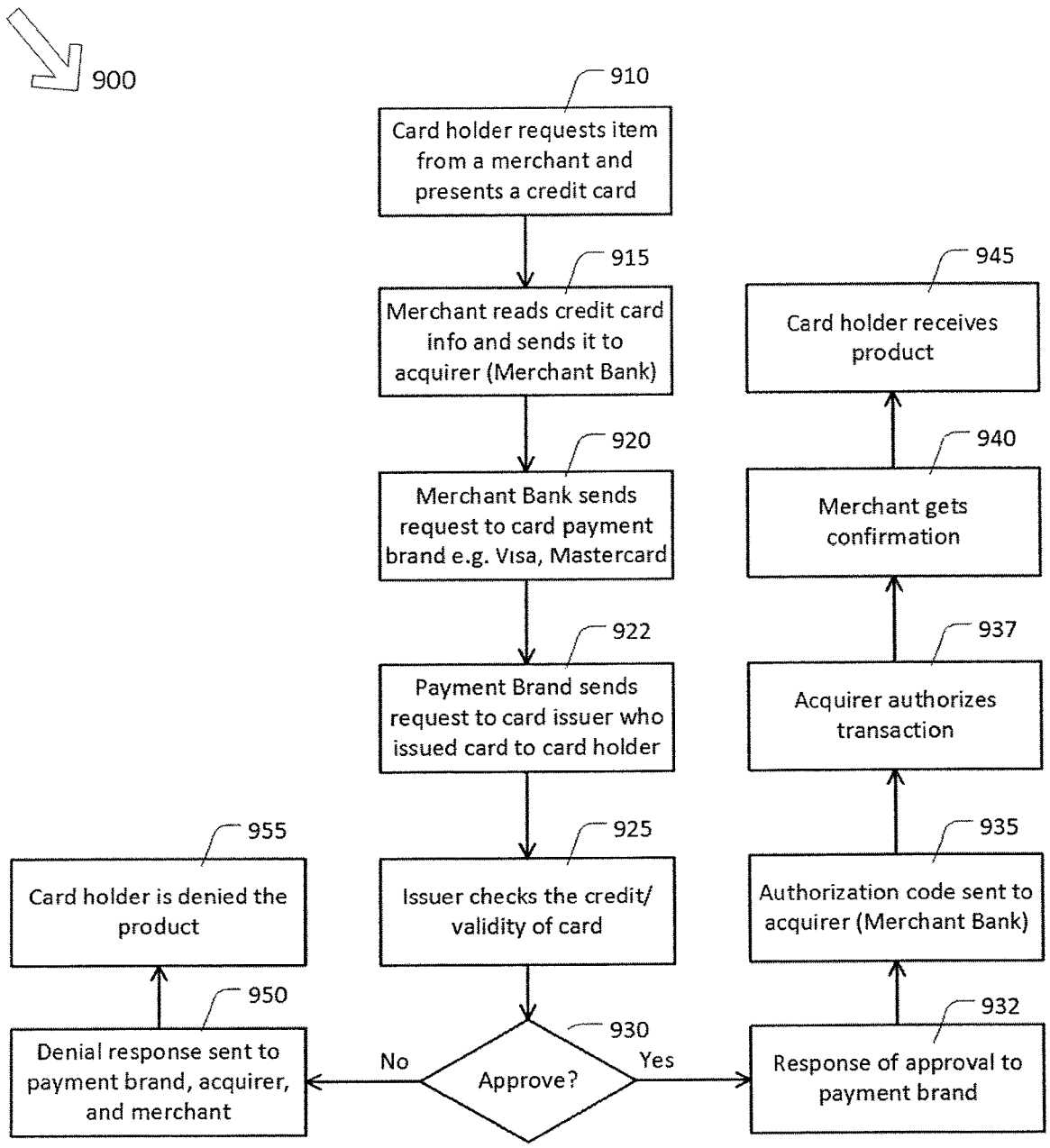
FIG. 9 is a flow chart of a basic framework of a credit card transaction process.

Reference numeral 900 in FIG. 9 is a flow chart that depicts how a typical credit card purchase is currently processed. Not all the details in card approval processing are shown in FIG. 9, but only the key transactional details are shown for the sake of brevity. This figure only highlights the Card-Present (CP) case. A slightly different process is followed in the Card-Not-Present (CNP) case. In step 910, a card holder presents his/her card to a merchant for buying a product. A card reader at the merchant site reads the card data and sends it to an acquirer that is generally a merchant bank in step 915. The merchant bank sends the request to a payment brand, e.g., Visa or MasterCard, for approval in step 920. The payment brand sends a request to the card issuer that is generally the bank where the cardholder has accounts in step 922. The issuer checks the available credit and the validity of the card, as well as the fraud situation such as the use of the card at an unexpected location, etc. in step 925. In step 930, the issuer either approves or denies the card payment. If the card is not valid or the credit is not available, a denial response is sent to the payment brand that communicates with the acquirer, and the acquirer communicates with the merchant in step 950. The cardholder is denied the product in step 955. If the card is approved by the issuer, a response of approval is sent to the payment brand in step 932. The payment brand sends an authorization code to the acquirer (merchant bank) in step 935. The acquirer authorizes the transaction in step 937 and sends the confirmation to the merchant in step 940. Finally, the card holder receives the product in step 945. Most of these steps are computerized with very little human intervention, and some or all of these steps can be combined in a computer algorithm with a seamless interface and transmission. Some of these steps may be eliminated.

Figure 10:
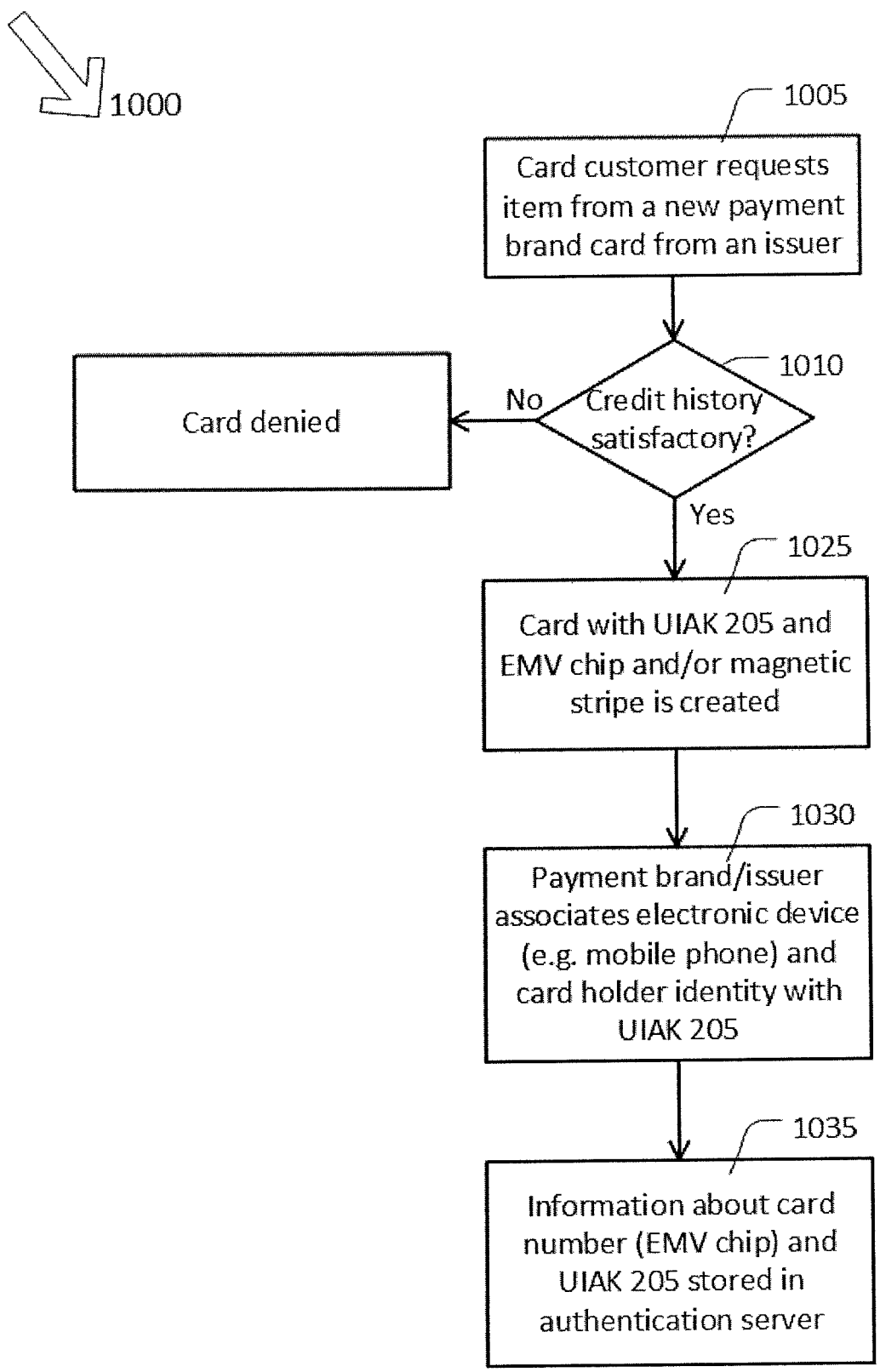
FIG. 10 is a flow chart depicting a credit card transaction process in which a key on the authentication tag can be used to identify a user.

Reference numeral 1000 in FIG. 10 is a flow chart that describes the process of issuing a credit card with the enhanced feature of the key 205 incorporated into the card. A card customer requests a payment brand card from an issuer with the key 205 in step 1005. The issuer checks the credit history of the customer at step 1010, and if the credit history is not satisfactory, the card is denied. If the credit history is good, the issuer may decide to issue a credit card to the customer. A card with the key 205 and an EMV chip and/or a magnetic stripe is created in step 1025. The EMV chip data, or magnetic stripe data, is associated with the key 205. The payment brand/issuer associates an electronic device such as one or more mobile phones of the cardholder and the cardholder identity with the key 205 on the card in step 1030. Information on the EMV chip, magnetic stripe data, and the key 205 are stored in an authentication server in step 1035. Some of the steps in FIG. 10 may be combined or eliminated, or the sequence may be altered depending on the brand owner/issuer processes.

Figure 11:
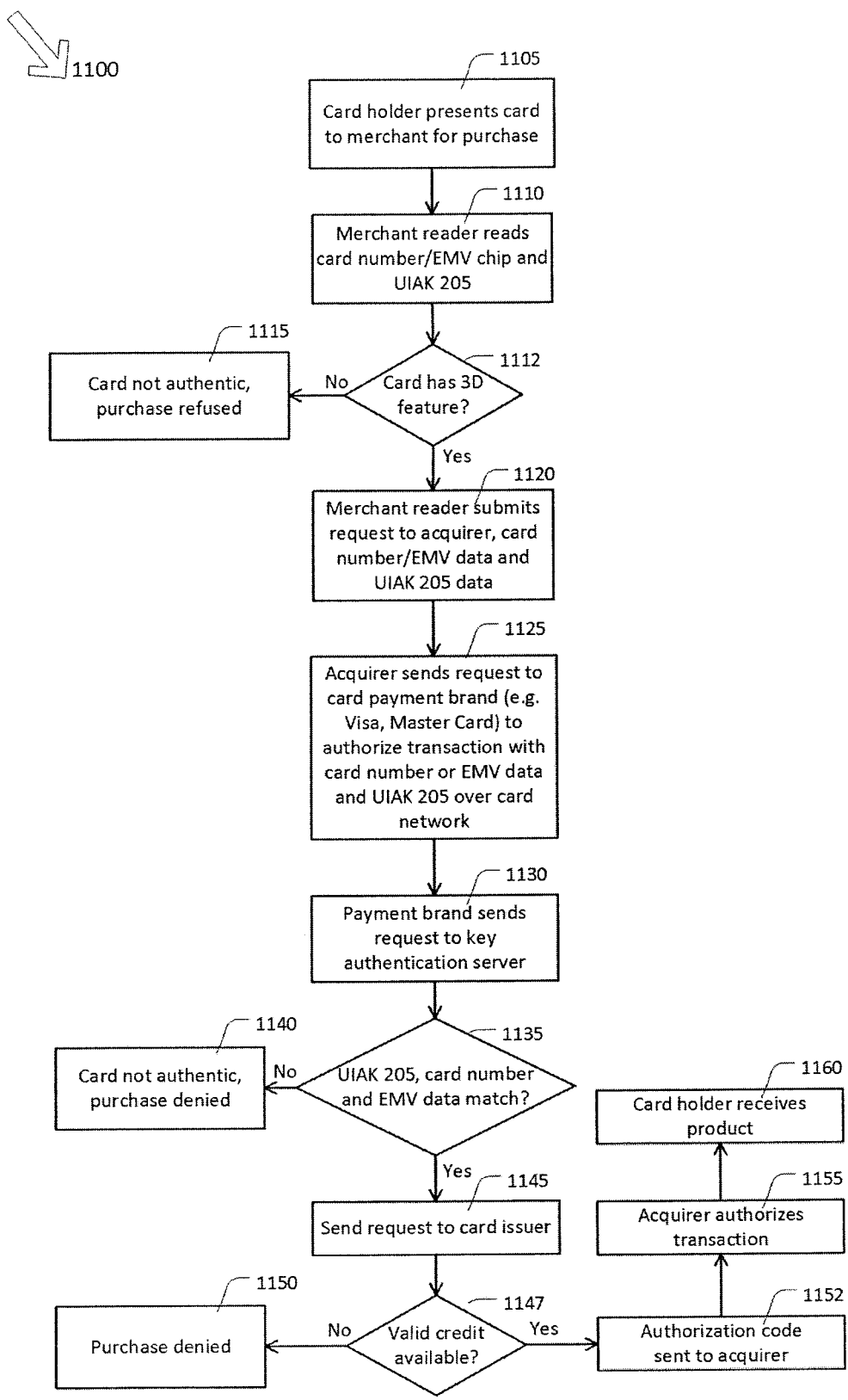
FIG. 11 is a flow chart depicting a credit card transaction process in which a key on the authentication tag can be used to complete the transaction.

Reference numeral 1100 in FIG. 11 is a flow chart that describes the process of authenticating the card with the enhanced key 205 when presented to the merchant for purchasing a product. Not all the details in card approval processing are shown in FIG. 11, but only the key transactional details are shown for the sake of brevity. This figure only highlights the Card-Present (CP) case. In step 1105, a cardholder presents his/her card to a merchant for buying a product. A card reader at the merchant site reads the card data in the EMV chip, or the magnetic stripe, and also the key 205 in step 1110. In step 1112, the 3D feature of the key 205 is ascertained. If the card's authentication key 205 does not have the 3D features, the card is rejected, and the purchase is refused as shown in step 1115. If the 3D feature is present, the merchant reader sends the request with the card information and the key datasets 14, 16 to the acquirer that is generally the merchant bank in step 1120. The acquirer (merchant bank) sends the request to a payment brand, e.g., Visa or MasterCard, for approval in step 1125. The payment brand sends a request to the authentication server where the key datasets 14, 16 and the associated database are kept, in step 1130. The authentication server compares the datasets 14, 16 of the key 205 stored in the authentication server with the data forwarded by the acquirer in step 1135. If the first dataset 14 stored at the address 16 of the second dataset of the key 205 does not match with data received from the acquirer in step 1135, then the card is not authentic, and the purchase is denied in step 1140. If there is a match in step 1135, the request is forwarded to the card issuer that is generally the bank where the cardholder has accounts in step 1145. The issuer checks the available credit and the validity of the card, as well as the fraud situation such as the use of the card at an unexpected location, etc. in step 1147. If the card is not valid or the credit is not available, a denial response is sent to the payment brand that communicates with the acquirer, and the acquirer communicates with the merchant in step 1150, and the cardholder is denied the product. If the card is approved by the issuer, a response of approval is sent to the payment brand, and an authorization code is sent to the acquirer (merchant hank) in step 1152. The acquirer authorizes the transaction in step 1155 and sends the confirmation to the merchant, and the cardholder receives the product in step 1160. Most of these steps are computerized with very little human intervention, and some or all of these steps can be combined in a computer algorithm with a seamless interface and transmission. Some of these steps may be eliminated. As mentioned earlier, not all the details in card approval processing are shown in FIG. 11, but only the key transactional details are shown for the sake of brevity.

Figure 12:
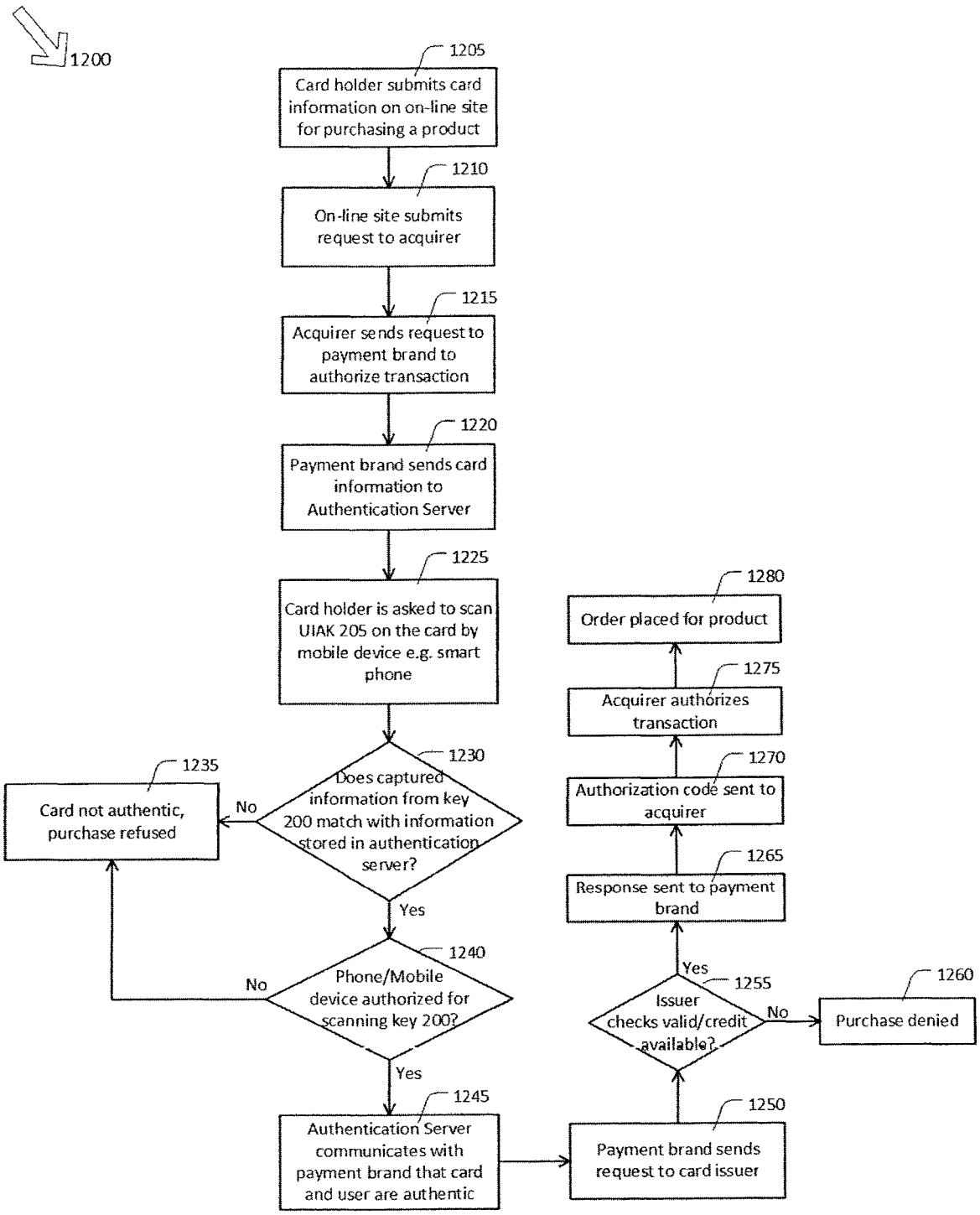
FIG. 12 is a flow chart depicting a credit card transaction process in which a key on the authentication tag and other information from a mobile device can be used to complete the transaction.

Reference numeral 1200 in FIG. 12 is a flow chart that describes the process of authenticating the card in the Card-Not-Present (CNP) situation. For CNP transactions, the cardholder may input the credit card information into an e-commerce site as is current practice in step 1205. The online e-commerce site submits a request to the acquirer in step 1210. The acquirer sends the request to the payment brand to authorize the transaction in step 1215. The payment brand sends the card information to the authentication server in step 1220. The card holder is asked to scan the key 205 embedded in the card holder's credit card using the cardholder's authorized mobile electronic device such as the cardholder's smartphone in step 1225. In step 1230, the authentication module of the authentication server compares the scanned information of the key 205 coming from the mobile electronic device with the stored information in the authentication database server. If the first dataset 14 of the key 205 stored at the address of the second dataset 16 of the key 205 does not match with data received from the mobile device/devices in step 1230 or the data received is not ascertained to contain a 3D feature, the card is not authentic, and the purchase is denied in step 1235. If the card is found to be authentic, then in step 1240, the authorization module of the authentication server checks to ascertain that the electronic device/smartphone is authorized to scan the key 205. If not, then the card user is not the correct user, and the transaction cannot be approved as shown in step 1235.

If the electronic device/smartphone is authorized to scan the key 205, then the authentication server communicates with the payment brand in step 1245 that the card is authentic, and the user is authorized to scan the card, and thus the card belongs to the user and it is in the possession of the user. Also, since smartphones/electronic devices these days have locking features, the phone can only be opened by inputting the password or by a fingerprint reader built into the phone, it is thus difficult, if not impossible, to place an order on an online site through a counterfeit card. In effect, the user has two private keys. One is the key 205 based on the credit card that is extremely difficult to clone, and the other is the smartphone/electronic device itself with its own built-in authentication features, such as a fingerprint or a password. Both of these have to be in the possession of an individual to place an order on an on-line site, thus eliminating fraud completely.

The payment brand sends the request to the card issuer entity in step 1250. The issuer checks the available credit. If the credit is not available, a denial response is sent to the payment brand that communicates with the acquirer, and the acquirer communicates with the on-line site, and the purchase is denied in step 1260. If the card is approved by the issuer, a response of approval is sent to the payment brand in step 1265 that, in turn, sends an authorization code to the acquirer (merchant bank) in step 1270. The acquirer authorizes the transaction in step 1275, and the order is placed on the site in step 1280. Most of these steps are computerized with very little human intervention other than the cardholder scanning the key 205 on the card. Some or all of these steps can be combined in a computer algorithm with a seamless interface and transmission. Some of these steps may be eliminated. As mentioned earlier, not all the details in card approval processing are shown in FIG. 12, but only the key transactional details are shown for the sake of brevity. Since the authorization to scan the key 205 is only limited to the credit card holder's smartphone, then it guarantees that no fraudulent CNP transaction can proceed. In step 1205 where the cardholder is instructed to submit the card information, the user name can be eliminated if the e-commerce site is equipped to accept the key scanning information directly from the cardholder.

Figure 13A:
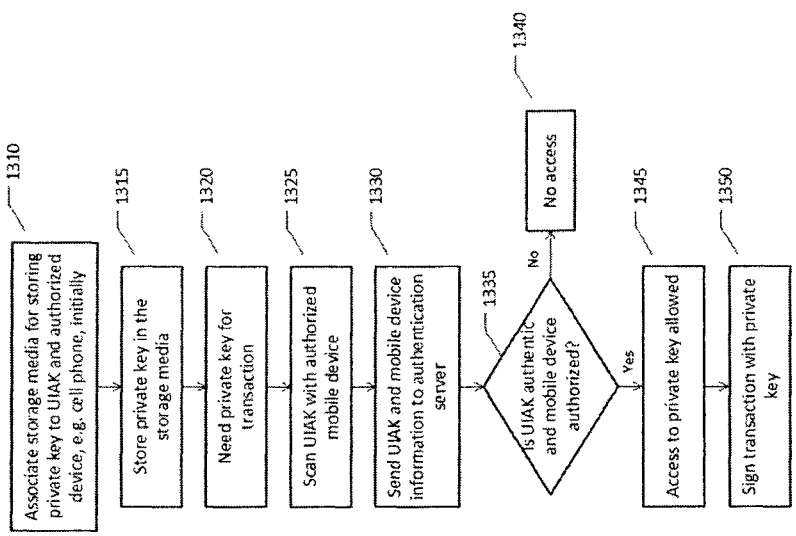
FIG. 13A is a flow chart depicting a method in which a key on the authentication tag and other information from a mobile device can be used to store a private key in storage media.

As described above, security is needed for cybercurrencies to protect the private key both in cold storage and hot storage. FIG. 13A depicts a flow chart that describes a process to insure that the private key indeed belongs to the owner who owns the private key. The private key is needed to conduct the transaction on the block chain to move or receive the currency to/from another public address. The private key may be stored in a storage media, such as a local device or a server, or in the cloud, etc. It is the access to the storage media that should not be accessible to a hacker. Another feature of this invention is directed to preventing access to the storage media for anyone other than the owner of that storage media.

Thus, in FIG. 13A, in step 1310, the key 205 and the mobile device that is authorized to read the key 205, is associated with a storage media address, such as the Media Access Control (MAC) address where the private key is to be located as a one-time event. The MAC, address is a globally unique identifier assigned to network devices, and therefore it is often referred to as a hardware or physical address. In step 1315, the private key is stored in the storage media. The access to the media is restricted only through the key 205 and the authorized mobile reading device. In step 1320, the owner wants to access the private key stored in the storage media. The owner is then requested to scan the key 205 in step 1325. The scanned images and the device information, and the geolocation coordinates of the scanning mobile device and the authorized time during which the scanning is allowed are all sent to an authentication server in step 1330. The authentication server checks the authenticity of the key 205 by analyzing the image data from key datasets 14, 16 and also the device ID, the geolocation data, and the time of scan in step 1335. If all these parameters are confirmed, the owner is provided access to the media storage to access the private key in step 1345; otherwise, the access is denied in step 1340. The owner can sign the transaction with the private key in step 1350.

Figure 13B:
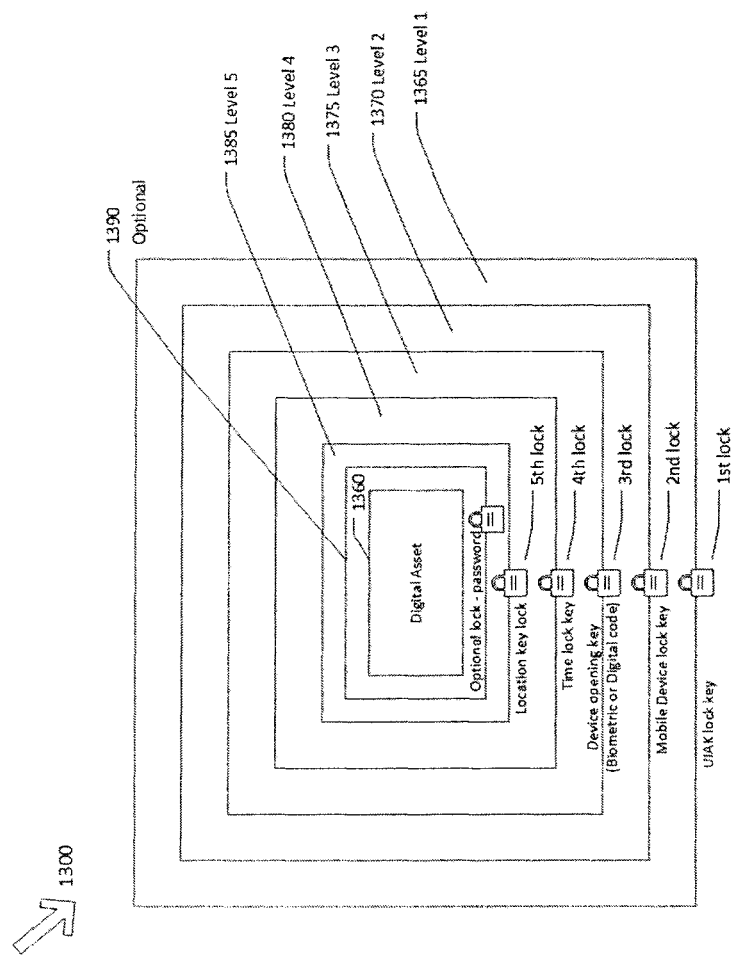
FIG. 13B is a view analogous to FIG. 6, in which the storage media of FIG. 13A is secured by multiple security levels.

Reference numeral 1300 in FIG. 13B is a flow chart that describes the levels of security available to a cryptocurrency owner similar to the security levels described above in connection with FIG. 6. The private key is stored in the storage media 1360. The physical possession of the key 205 makes it very difficult for anyone to breach the first lock because the key 205 is extremely hard to clone, if not impossible, and this key 205 is not prone to any virus or other types of attack. This first security lock level is shown as 1365 in FIG. 13B. The first lock of the key 205 can only be used with the device key 1370. The device key is the mobile device of the user that has been specially authorized to scan the key 205. If a third party such as a hacker tries to scan the key 205, then his mobile device will not work, and he/she will be denied access. Both the device key and the key 205 must be together in the hands of the owner to access the private key. This second security lock level is shown as 1370 in FIG. 13B. Additionally, most mobile devices are further protected either by biometrics, such as fingerprints or eye scans, or by a multi-digit passcode. Unless the user uses one of these to open the device, the device cannot be used to scan the key. This level of security of the mobile device itself is depicted as level 3 at 1375 in FIG. 13B.

There are additional levels of security that may also be provided. The level 4 security 1380 limits the time during which the digital asset can be accessed, such as weekdays from 8 AM to 5 PM, or any time desirable by the private key owner. The access can be further controlled by assigning the geolocation coordinates from where the access to the storage media will be allowed, as shown by security level 5 at 1385. In addition, the owner can further limit access by providing password/passcode access as another optional level of security as in 1390.

In addition to the security levels provided in FIG. 13B, the owner can further enhance the security by providing multiple keys 205 and multiple mobile devices, and by requiring that all or some of them together in various combinations operate in order to access the storage media. For example, two keys A and B may be provided, and one mobile device X may be authorized to read key A, and another mobile device Y may be authorized to read key B. Only when both keys A and B are used with this combination will access be allowed to storage media 1360. Alternately, both mobile devices X and Y may be authorized to open both keys A and B. The owner may have 3, 4, 5, or any number of keys and any number of authorized mobile devices to work with them. The owner of the private key may decide to have any desirable combination to reach whatever level of security is needed. For example, the owner may have 2 out of 2, or 2 out of 3, or 3 out of 5 keys with associated mobile devices to have access to the storage media 1360. This method of providing security to the private key can be used for hot and/or cold storage.

In accordance with still another feature of this invention, people also typically keep a large number of identifying articles with them. These could be cards in their wallet, pockets, or purses. These cards include credit/debit cards, driver's licenses, ID cards, loyalty cards, border crossing cards, government issued cards for accessing benefits, voter identification cards, military cards, and health cards, amongst others. The purpose for these cards is different and therefore one has no choice except to carry all these cards as needed. The identifying articles need not be in the form of cards. They could be keychains, separate custom plastic tags, custom key tags, hand tags, or key fobs. The key 205 in the form of a physical item or a card can serve all these purposes while also allowing access to a website or any secure server.

In order to access any such card, the user can launch an app on their authorized mobile device. The app displays various cards/services/assets that may be activated on their mobile app as shown in 1401 in FIG. 14A. For illustration purposes, this app is identified herein as TheCard App. Numeral 1405 is an e-mail access icon, numeral 1410 is a server access icon, numeral 1415 is a Visa credit card access icon, numeral 1420 is a Master Card access icon, numeral 1425 is an ID card icon, and numeral 1430 is the user's health card icon. There may be multiple other cards/services/assets that may be activated by actuating the appropriate icons.

As explained earlier, the key 205 and the authorized mobile device together constitute a requisite pair of two physical keys, and both of these keys are necessary to access a card/service/asset. This unique combination of the key 205 and the associated mobile device establishes the identity of the user in a unique manner since the key 205 and the mobile device belong to only one user. The key 205 cannot be cloned or reproduced. The mobile phone is also unique to a user. Normally, the mobile device is further protected by a biometric, such as a fingerprint or eye scan, or a passcode of multiple digits known only to the user. If the unique identity item is not authentic and/or the device is not authorized to read it, the user is denied access to any of the cards/services/assets shown in FIG. 14A.

Figure 14A:
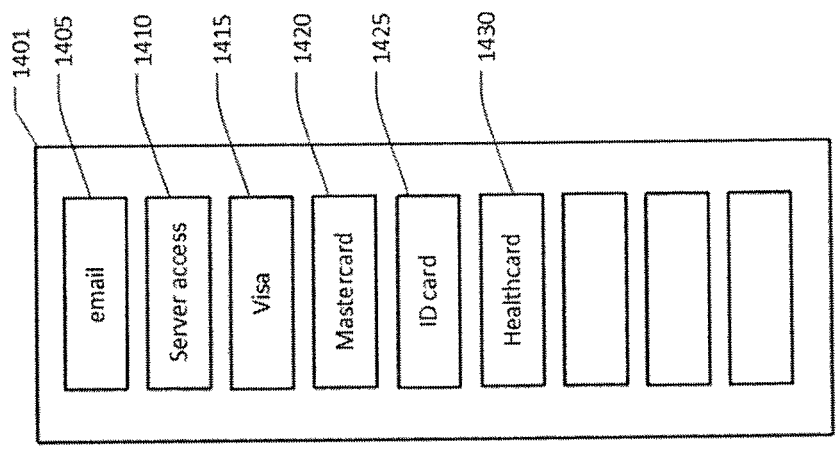
FIG. 14A is a display of card/asset/service icons to be accessed on a mobile device.
Figure 14B:
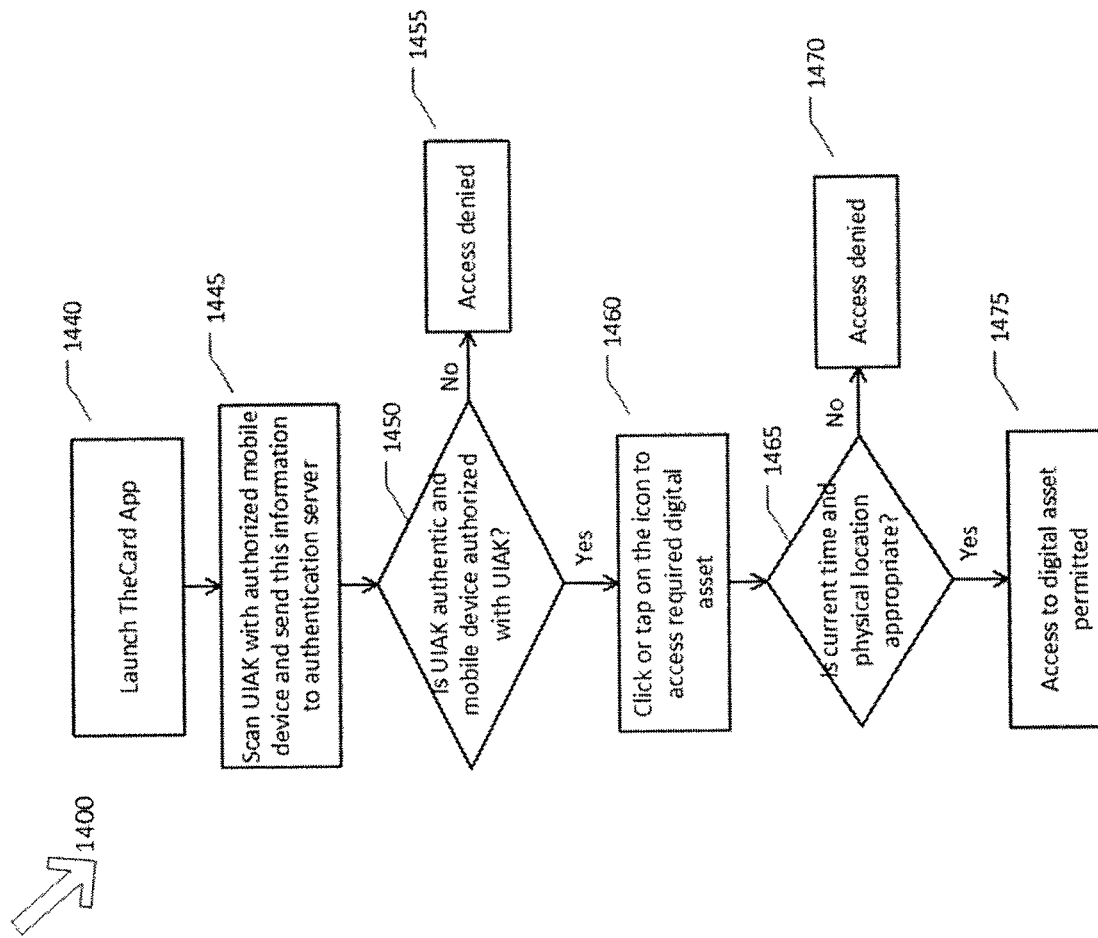
FIG. 14B is a flow chart depicting a method in which a key on the authentication tag and other information from a mobile device can be used to launch any of the icons of FIG. 14A.

Reference numeral 1400 in FIG. 14B depicts the process by which any of the cards/services/assets shown in FIG. 14A can be accessed. When a user wants to access a card/asset/service, he/she will launch the app, e.g., the TheCard App, on their mobile device or a desktop as shown in step 1440. The user is then instructed to scan the key 205 with the authorized device, and this information is sent to an authentication server in step 1445. The authentication server checks if the key 205 and the mobile device are the requisite pair of physical keys in step 1450. If the answer is yes, the owner is directed to click or tap on the card/asset/service icon that the owner is attempting to access in step 1460. If not, the access is denied in step 1455. In step 1465, the authentication server also checks if the time to access the card/asset/service is as authorized by the user and physical locations from where the access is allowed, are appropriate. If not, access is denied as in step 1470. If yes, then the owner is allowed access to the service or digital asset in step 1475.

Theft of personal information is possible by hacking various sites such as those who keep credit histories. Thieves could use this information to open new lines of credit in a person's name and can obtain loans, mortgages, and credit cards. Social security numbers or equivalent ID numbers are the primary means of identification for most people in most countries. If hackers can access and obtain social security numbers, a person's identity can be stolen. It is the one unique piece of information that every consumer has. There are other alternatives such as fingerprints, eye scans, or the face of a person. In some countries, the social security numbers are combined with fingerprints and eye scans and voice patterns to protect an individual's identity.

However, biometric authentication systems are not 100% accurate. Environment and usage can affect biometric measurements. They cannot be reset once compromised. It has also been found that master fingerprints can trick many systems. Researchers have also discovered that a set of five master fingerprints can defeat a system 65% of the time. And, since there is no way to modify your iris, retina or fingerprint, once somebody has a working copy of these, there is not much one can do to stay safe.

In accordance with yet another feature of this invention, a person can easily associate the key 205 with a social security number. Any organization that provides credit may ask the credit seeker to prove their identity by reading their key 205 with an authorized mobile device as explained above. This insures the protection of an individual's identity.

The steps shown in the various flow charts are provided only for illustration purposes, because the sequence of these steps can be easily changed, and some of these steps can be combined or eliminated, and some additional steps may be added. The hardware and software elements needed to perform these steps can be easily changed, or combined and even eliminated without losing the intent of this invention. The described steps are thus only illustrative. In addition, the various levels of security are provided only for illustration purposes, because more or less security levels may be provided.

The invention claimed is:

1. A method in a mobile device of securing, for a user, authorized access to a website, comprising:
   requesting, in a browser of the mobile device, to login to the website based on an authentication tag associated with the user and applied to a physical object accessible to the user, the authentication tag being configured with a first dataset comprised of a random distribution of three-dimensional elements and with a second dataset comprised of machine-readable data elements, the first and second datasets together comprising an authentication key having key data that uniquely identifies the object and, in turn, the user, wherein the key data indicative of the authentication tag and the user is previously stored in a database of an authentication server;
   accessing, in the browser, a webpage of the authentication server based on browser redirection by the website, the webpage displaying a machine-readable code corresponding to a unique session ID;
   accessing a reading device of the mobile device associated with the user, the mobile device being configured with a unique, unchanging hardware identifier, wherein the hardware identifier indicative of the mobile device is previously stored in the database of the authentication server;
   operating the reading device, by an app in the mobile device, to read the machine-readable code to extract the session ID;
   operating, by the app, the reading device of the authorized mobile device to read the authentication key with the reading device in response to a prompt;
   communicating, by the app, the read authentication key, the read session ID, and the hardware identifier to the authentication server;
   permitting, in the app, the user to select information to share with the website, based on the authentication server determining that the read authentication key matches the stored key data and that the sent hardware identifier matches the stored hardware identifier; and
   accessing the website, in the browser, as a logged-in user based on browser redirection by the webpage with a token corresponding to the information selected by the user.

2. The method of claim 1, wherein the authorized mobile reading device is configured as a portable, handheld, image capture device, and is operated by aiming the image capture device at the authentication tag to capture return light from the three-dimensional elements;
   wherein the determining is performed by processing the captured return light from the three-dimensional elements to obtain an image pattern;
   wherein the stored key data includes an authentication pattern signature indicative of the captured return light from the three-dimensional elements;
   wherein the data elements are light-reflective and encoded with an address identifier uniquely associated with the authentication pattern signature;
   wherein the image capture device also captures return light from the data elements; and
   wherein the determining is further performed by decoding the address identifier, by locating the authentication pattern signature associated with the decoded address identifier, and by comparing the image pattern with the located authentication pattern signature.

3. The method of claim 2, wherein the stored authentication pattern signature is colored,
   wherein the key data is configured by coloring the three-dimensional elements,
   wherein the processing of the return light captured from the three-dimensional elements obtains a colored image pattern, and
   wherein the comparing is performed by matching the colored image pattern with the colored authentication pattern signature.

4. The method of claim 1, wherein the barcode displayed on the webpage further corresponds to session parameters,
   wherein the session parameters and the session ID are stored in the database, and
   wherein permitting, in the app, the user to select information includes permitting the user to select information based on the authentication server also determining that the read session ID matches the stored session parameters.

5. The method of claim 4, further comprising:
   communicating, by the app, geolocation coordinates of the authorized mobile device to the authorization server, wherein authorized geolocation coordinates and times of operation are previously stored in the database;
   wherein the stored session parameters are configured as at least one of the group consisting of random numbers, time of generation of the session code, and website address of the website; and
   wherein permitting, in the app, the user to select information includes permitting the user to select information based on the authentication server also determining that the geolocation coordinates of the authorized mobile reading device match the stored authorized geolocation coordinates and that a time of scanning the machine-readable code matches the stored authorized times of operation.

6. The method of claim 4, further comprising registering a name of the user with the website when the read session ID matches the stored session parameters, and when the read authentication key matches the stored key data, and when the sent hardware identifier matches the stored hardware identifier.

7. The method of claim 4, wherein the object is a portable card bearing the authentication key, the method further comprising registering the card to uniquely identify the user when the read session ID matches the stored session parameters, and when the read authentication key matches the stored key data, and when the sent hardware identifier matches the stored hardware identifier.

8. The method of claim 4, wherein the object is a storage medium that stores a private key, the method further comprising allowing access to the private key when the read session ID matches the stored session parameters, and when the read authentication key matches the stored key data, and when the sent hardware identifier matches the stored hardware identifier.

9. The method of claim 4, further comprising:
displaying a plurality of icons indicative of at least one of a card, a service, or an asset on the authorized mobile device,
permitting the user to select one of the plurality of icons, and
activating the selected icon when the read session ID matches the stored session parameters, and when the read authentication key matches the stored key data, and when the sent hardware identifier matches the stored hardware identifier.

10. The method of claim 4, further comprising:
operating at least one additional mobile device to read the session ID and the authentication key;
communicating the read authentication key and an additional hardware identifier indicative of the at least one additional authorized mobile device to the authentication server, the authentication server previously storing the authentication key and the additional hardware identifier in the database; and
accessing the website based on the authentication server determining that the session ID read by the at least one additional mobile reading device matches the stored session parameters, that the authentication key read by the at least one additional mobile reading device matches the stored key data, and that the sent additional hardware identifier matches the stored hardware identifier of the at least one additional mobile reading device.

11. The method of claim 10,
wherein the authentication tag is configured with an additional authentication key that uniquely identifies the object and the user;
wherein additional key data indicative of the additional authentication key is stored in the database; and
the method further comprising reading each authentication key with either authorized mobile device.

12. The method of claim 1, wherein the machine-readable data of the second dataset is encoded in at least one radio frequency identification (RFID) chip.

13. A method of securing, for a user, authorized access to a website, comprising:
requesting, in a browser of a computing device, to login to the website based on an authentication tag associated with the user and applied to a physical object accessible to the user, the authentication tag being configured with a first dataset comprised of a random distribution of three-dimensional elements and with a second dataset comprised of machine-readable data elements, the first and second datasets together comprising an authentication key having key data that uniquely identifies the object and, in turn, the user, wherein the key data indicative of the authentication tag and the user is previously stored in a database of an authentication server;
displaying, in the browser of the computing device, a machine-readable code generated by the website, the machine-readable code corresponding to a unique session ID, a time of the request, a URL of the website, and a URL of the authentication server;
accessing a reading device of a mobile device associated with the user, the mobile-device being configured with a unique, unchanging hardware identifier, wherein the hardware identifier indicative of the mobile device is previously stored in the database of the authentication server;
operating the reading device of the mobile device, by an app in the mobile device, to read the machine-readable code displayed in the browser of the computing device to extract the session ID, the time of the request, the URL of the website, and the URL of the authentication server;
operating, by the app in the mobile device, the reading device of the authorized mobile device to read the authentication key with the reading device in response to a prompt;
communicating, by the app based on the URL of the authentication server, the read authentication key, the read session ID, the time of the request, the URL of the website, a geolocation coordinate of the mobile device, and the hardware identifier, to the authentication server; and
accessing the website, in the browser of the computing device, as a logged-in user based on the authentication server:
determining that the read authentication key matches the stored key data, the time of the request matches authorized times of operation, and the sent hardware identifier matches the stored hardware identifier,
retrieving a username for the user based on the URL of the website, and
communicating instructions to the website to log in the user based on the session ID and the retrieved username for the user.

14. A method in a mobile device of securing, for a user, authorized access to a web site, comprising:
requesting, in a browser of the mobile device, to login to the website based on an authentication tag associated with the user and applied to a physical object accessible to the user, the authentication tag being configured with a first dataset comprised of a random distribution of three-dimensional elements and with a second dataset comprised of machine-readable data elements, the first and second datasets together comprising an authentication key having key data that uniquely identifies the object and, in turn, the user, wherein the key data indicative of the authentication tag and the user is previously stored in a database of an authentication server;
displaying, in the browser, a link generated by the website, the link containing information including a unique session ID, a time of the request, a URL of the website, and a URL of the authentication server;
opening an app in the mobile device in response to a user selection of the link in the browser, the user selection of the link conveying the information to the app;
accessing a reading device of the mobile device associated with the user, the mobile device being configured with a unique, unchanging hardware identifier, wherein the hardware identifier indicative of the mobile device is previously stored in the database of the authentication server;
operating, by the app, the reading device of the authorized mobile device to read the authentication key with the reading device in response to a prompt;

communicating, by the app based on the URL of the authentication server, the read authentication key, the read session ID, the time of the request, the URL of the website, a geolocation coordinate of the mobile device, and the hardware identifier, to the authentication server; and accessing the website, in the browser, as a logged-in user based on the authentication server:
  determining that the read authentication key matches the stored key data, the time of the request matches authorized times of operation, and the sent hardware identifier matches the stored hardware identifier,
  retrieving a username for the user based on the URL of the website, and
  communicating instructions to the website to log in the user based on the session ID and the retrieved username for the user.

\* \* \* \* \*